(12) United States Patent
Watanabe

(10) Patent No.: US 12,100,365 B2
(45) Date of Patent: Sep. 24, 2024

(54) DISPLAY SYSTEM WITH IMAGE DEFORMATION PROCESSING

(71) Applicant: Japan Display Inc., Tokyo (JP)

(72) Inventor: Yoshihiro Watanabe, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/223,204

(22) Filed: Jul. 18, 2023

(65) Prior Publication Data

US 2023/0368744 A1 Nov. 16, 2023

Related U.S. Application Data

(63) Continuation of application No. PCT/JP2021/047139, filed on Dec. 20, 2021.

(30) Foreign Application Priority Data

Feb. 1, 2021 (JP) ................. 2021-014669

(51) Int. Cl.
G09G 3/36 (2006.01)
G09G 3/00 (2006.01)
G09G 3/20 (2006.01)

(52) U.S. Cl.
CPC ........... *G09G 3/3607* (2013.01); *G09G 3/002* (2013.01); *G09G 3/2074* (2013.01);
(Continued)

(58) Field of Classification Search
CPC ................................................. G09G 3/3607
See application file for complete search history.

(56) References Cited

U.S. PATENT DOCUMENTS 10,074,700 B2 9/2018 Nakamura et al.
2011/0285753 A1 11/2011 Park et al.
(Continued)

FOREIGN PATENT DOCUMENTS

JP 2007-325043 A 12/2007
JP 2011-242744 A 12/2011
(Continued)

OTHER PUBLICATIONS

International Search Report issued in International Patent Application No. PCT/JP2021/047139 on Mar. 1, 2022 and English translation of same. 6 pages.
(Continued)

*Primary Examiner* — Gustavo Polo
(74) *Attorney, Agent, or Firm* — K&L Gates LLP

(57) ABSTRACT

A display system includes a display device including a liquid crystal display panel including pixels, the pixels each including a plurality of sub pixels and being arranged in a matrix of rows and columns in a first direction and a second direction different from the first direction, and an image generation device including a control circuit configured to perform image deformation processing of an input image in accordance with a pixel structure of the liquid crystal display panel. The image generation device and the display device are coupled to each other through wired or wireless communication, and the control circuit generates pixel values of all the sub pixels of the liquid crystal display panel in the image deformation processing.

13 Claims, 35 Drawing Sheets

(52) U.S. Cl.
CPC ..... *G09G 3/3648* (2013.01); *G09G 2340/045* (2013.01); *G09G 2340/0457* (2013.01); *G09G 2340/0464* (2013.01)

(56) References Cited

U.S. PATENT DOCUMENTS

| | | |
|---|---|---|
| 2017/0039911 A1 | 2/2017 | Guo et al. |
| 2018/0061307 A1* | 3/2018 | Inoue .................... H10K 59/12 |
| 2019/0156466 A1 | 5/2019 | Cho et al. |
| 2022/0146828 A1 | 5/2022 | Ohba |

FOREIGN PATENT DOCUMENTS

| | | |
|---|---|---|
| JP | 2017-044768 A | 3/2017 |
| WO | WO2020/170454 A1 | 8/2020 |

OTHER PUBLICATIONS

Written Opinion issued in International Patent Application No. PCT/JP2021/047139 on Mar. 1, 2022. 4 pages.

Office Action issued in related Japanese Patent Application No. 2022-578149, issued on Mar. 19, 2024, and English translation of same. 7 pages.

\* cited by examiner

FIG. 9

| NUMBER | SYMBOL | COORDINATES OF DATA DEFINITION POINT | | DATA (PIXEL INTENSITY) | | |
|---|---|---|---|---|---|---|
| | | x | y | R | G | B |
| 1 | P0,0 | 0 | 0 | R0,0 | G0,0 | B0,0 |
| 2 | P1,0 | 1 | 0 | R1,0 | G1,0 | B1,0 |
| 3 | P2,0 | 2 | 0 | R2,0 | G2,0 | B2,0 |
| 4 | P3,0 | 3 | 0 | R3,0 | G3,0 | B3,0 |
| ... | ... | ... | ... | ... | ... | ... |
| n-1 | Pn-2,0 | n-2 | 0 | Rn-2,0 | Gn-2,0 | Bn-2,0 |
| n | Pn-1,0 | n-1 | 0 | Rn-1,0 | Gn-1,0 | Bn-1,0 |
| n+1 | P0,1 | 0 | 1 | R0,1 | G0,1 | B0,1 |
| n+2 | P1,1 | 1 | 1 | R1,1 | G1,1 | B1,1 |
| n+3 | P2,1 | 2 | 1 | R2,1 | G2,1 | B2,1 |
| n+4 | P3,1 | 3 | 1 | R3,1 | G3,1 | B3,1 |
| ... | ... | ... | ... | ... | ... | ... |
| 2n-1 | Pn-2,1 | n-2 | 1 | Rn-2,1 | Gn-2,1 | Bn-2,1 |
| 2n | Pn-1,1 | n-1 | 1 | Rn-1,1 | Gn-1,1 | Bn-1,1 |
| 2n+1 | P0,2 | 0 | 2 | R0,2 | G0,2 | B0,2 |
| ... | ... | ... | ... | ... | ... | ... |
| nm-1 | Pn-2,m-1 | n-2 | m-1 | Rn-2,m-1 | Gn-2,m-1 | Bn-2,m-1 |
| nm | Pn-1,m-1 | n-1 | m-1 | Rn-1,m-1 | Gn-1,m-1 | Bn-1,m-1 |

DATA OF FIRST ROW → (rows 1 to n)
DATA OF SECOND ROW → (rows n+1 to 2n)
DATA OF LAST ROW

FIG.30

| sub-Pixel position | | R | | | | G | | | | B | | | |
|---|---|---|---|---|---|---|---|---|---|---|---|---|---|
| sx | sy | $K_{xpR}$ | $K_{xmR}$ | $K_{ypR}$ | $K_{ymR}$ | $K_{xpG}$ | $K_{xmG}$ | $K_{ypG}$ | $K_{ymG}$ | $K_{xpB}$ | $K_{xmB}$ | $K_{ypB}$ | $K_{ymB}$ |
| 0 | 0 | 0 | 1/4 | 0 | 1/6 | 1/4 | 0 | 0 | 1/6 | 0 | 1/4 | 1/2 | 0 |
| 1 | 0 | 1/4 | 0 | 0 | 1/6 | 0 | 1/4 | 1/2 | 0 | 0 | 1/4 | 0 | 1/6 |
| 2 | 0 | 0 | 1/4 | 1/2 | 0 | 0 | 1/4 | 0 | 1/6 | 1/4 | 0 | 0 | 1/6 |
| 0 | 1 | 1/4 | 0 | 0 | 1/2 | 0 | 1/4 | 1/6 | 0 | 1/4 | 0 | 1/6 | 0 |
| 1 | 1 | 0 | 1/4 | 1/6 | 0 | 1/4 | 0 | 1/6 | 0 | 1/4 | 0 | 0 | 1/2 |
| 2 | 1 | 1/4 | 0 | 1/6 | 0 | 1/4 | 0 | 0 | 1/2 | 0 | 1/4 | 1/6 | 0 |

FIG.35

| sub-Pixel position | | R | | | | G | | | | B | | | |
|---|---|---|---|---|---|---|---|---|---|---|---|---|---|
| sx | sy | $k_{xpR}$ | $k_{xmR}$ | $k_{ypR}$ | $k_{ymR}$ | $k_{xpG}$ | $k_{xmG}$ | $k_{ypG}$ | $k_{ymG}$ | $k_{xpB}$ | $k_{xmB}$ | $k_{ypB}$ | $k_{ymB}$ |
| 0 | 0 | 0 | 1/4 | 0 | 0 | 1/4 | 0 | 0 | 0 | - | - | - | - |
| 1 | 0 | 1/4 | 0 | 0 | 0 | - | - | - | - | 0 | 1/4 | 0 | 0 |
| 2 | 0 | - | - | - | - | 0 | 1/4 | 0 | 0 | 1/4 | 0 | 0 | 0 |
| 0 | 1 | 1/4 | 0 | 0 | 0 | - | - | - | - | 0 | 1/4 | 0 | 0 |
| 1 | 1 | - | - | - | - | 0 | 1/4 | 0 | 0 | 1/4 | 0 | 0 | 0 |
| 2 | 1 | 0 | 1/4 | 0 | 0 | 1/4 | 0 | 0 | 0 | - | - | - | - |
| 0 | 2 | - | - | - | - | 0 | 1/4 | 0 | 0 | 1/4 | 0 | 0 | 0 |
| 1 | 2 | 0 | 1/4 | 0 | 0 | 1/4 | 0 | 0 | 0 | - | - | - | - |
| 2 | 2 | 1/4 | 0 | 0 | 0 | - | - | - | - | 0 | 1/4 | 0 | 0 |

| R | | | | G | | | | B | | | |
|---|---|---|---|---|---|---|---|---|---|---|---|
| $k_{xpR}$ | $k_{xmR}$ | $k_{ypR}$ | $k_{ymR}$ | $k_{xpG}$ | $k_{xmG}$ | $k_{ypG}$ | $k_{ymG}$ | $k_{xpB}$ | $k_{xmB}$ | $k_{ypB}$ | $k_{ymB}$ |
| 0 | 1/3 | 0 | 0 | 0 | 0 | 0 | 0 | 1/3 | 0 | 0 | 0 |

DISPLAY SYSTEM WITH IMAGE DEFORMATION PROCESSING

CROSS-REFERENCE TO RELATED APPLICATION

This application is a continuation of PCT international application Ser. No. PCT/JP2021/047139 filed on Dec. 20, 2021 which designates the United States, incorporated herein by reference, and which claims the benefit of priority from Japanese Patent Application No. 2021-014669, filed on Feb. 1, 2021, incorporated herein by reference.

BACKGROUND

1. Technical Field

This invention relates to a display system.

2. Description of the Related Art

A virtual reality (VR) system provides a virtual sense of reality to a user by changing image display along with viewpoint movement. Examples of a display device for achieving such a VR system include a disclosed technology of mounting a head mounted display (hereinafter also referred to as an "HMD") on a head and displaying a video in accordance with body motion or the like (for example, Japanese Patent Application Laid-open Publication No. 2017-44768).

In an HMD used in a VR system, a displayed video is enlarged through an eyepiece lens, and accordingly, an image displayed on a display panel is distorted. Thus, it has been typically performed to distort the original image in advance with taken into account image distortion due to the lens, feed the image to the display panel, and perform image conversion processing such as resolution conversion processing and pixel value conversion processing on the display panel side in accordance with the resolution and the pixel arrangement of the display panel. However, when the resolution of the display panel is lower than the resolution of the fed image or when the display panel presupposes that what is called subpixel rendering processing is performed, the amount of fed data is larger than the amount of actually displayed data and waste occurs.

The present disclosure is made in view of the above-described problem and intended to provide a display system capable of performing transmission and reception in a data amount in accordance with a pixel arrangement of a display panel.

SUMMARY

A display system according to an embodiment of the present disclosure includes a display device including a liquid crystal display panel including pixels, the pixels each including a plurality of sub pixels and being arranged in a matrix of rows and columns in a first direction and a second direction different from the first direction, and an image generation device including a control circuit configured to perform image deformation processing of an input image in accordance with a pixel structure of the liquid crystal display panel. The image generation device and the display device are coupled to each other through wired or wireless communication, and the control circuit generates pixel values of all the sub pixels of the liquid crystal display panel in the image deformation processing.

BRIEF DESCRIPTION OF THE DRAWINGS

FIG. 9 is a diagram illustrating an example of image data input to the display system according to the embodiment;

FIG. 30 is a diagram illustrating four coefficient values for each sub pixel in the pixel configuration illustrated in FIG. 28;

FIG. 35 is a diagram illustrating four coefficient values for each sub pixel in the pixel configuration illustrated in FIG. 34;

DETAILED DESCRIPTION

Aspects (embodiments) of the present disclosure will be described below in detail with reference to the accompanying drawings. Contents described below in the embodiments do not limit the present disclosure. Constituent components described below include those that could be easily thought of by the skilled person in the art and those identical in effect. Constituent components described below may be combined as appropriate. What is disclosed herein is merely exemplary, and any modification that could be easily thought of by the skilled person in the art as appropriate without departing from the gist of the present disclosure is contained in the scope of the disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and the drawings, any component same as that already described with reference to an already described drawing is denoted by the same reference sign, and detailed description thereof is omitted as appropriate in some cases.

Figure 1:
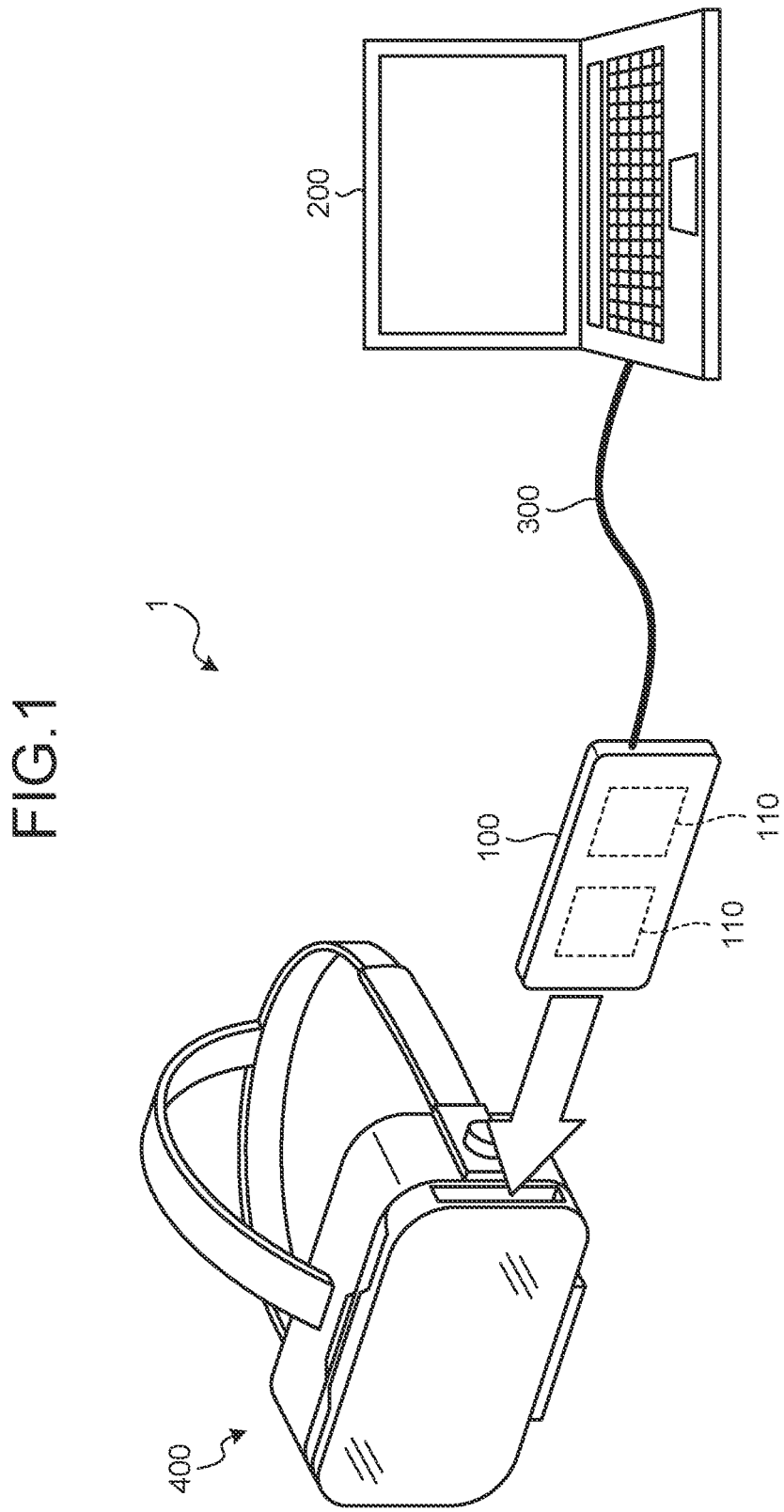
FIG. 1 is a configuration diagram illustrating an example of a display system according to an embodiment.
Figure 2:
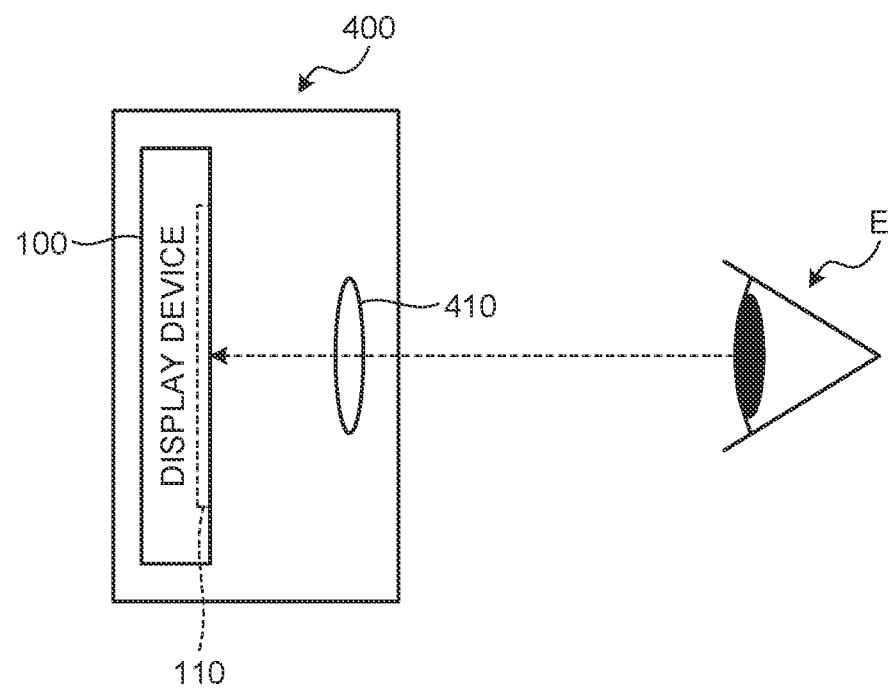
FIG. 2 is a schematic diagram illustrating an example of the relative relation between a display panel and an eye of a user.

FIG. 1 is a configuration diagram illustrating an example of a display system according to an embodiment. FIG. 2 is a schematic diagram illustrating an example of the relative relation between a display panel and an eye of a user.

In the present embodiment, a display system 1 is a display system configured to change display along with motion of the user. For example, the display system 1 is a VR system configured to provide a virtual sense of reality to the user by stereoscopically displaying a virtual reality (VR) image illustrating a three-dimensional object or the like in a virtual space and changing the stereoscopic display along with the orientation (position) of the head of the user.

As illustrated in FIG. 1, the display system 1 includes, for example, a display device 100 and an image generation device 200. The display device 100 and the image generation device 200 are coupled to each other in a wired manner through, for example, a cable 300. The cable 300 includes, for example, a Universal Serial Bus (USB) or High-Definition Multimedia Interface (HDMI) (registered trademark) cable. The display device 100 and the image generation device 200 may be coupled to each other through wireless communication.

In the present disclosure, the display device 100 is used as, for example, a head mounted display device fixed to a mounting member 400 and mounted on the head of the user. The display device 100 includes a display panel 110 for displaying an image generated by the image generation device 2. Hereinafter, the configuration in which the display device 100 is fixed to the mounting member 400 is also referred to as "head mounted display (HMD)".

In the present disclosure, the image generation device 200 is, for example, an electronic apparatus such as a personal computer or a game apparatus. The image generation device 200 generates a VR image in accordance with the position and posture of the head of the user and outputs the VR image to the display device 100. The image generated by the image generation device 200 is not limited to a VR image.

The display device 100 is fixed to such a position that the display panel 110 is disposed in front of the eyes of the user when the HMD is mounted on the user. The display device 100 may include, in addition to the display panel 110, voice output devices such as speakers at positions corresponding to the ears of the user when the HMD is mounted on the user. As described later, the display device 100 may include a sensor (for example, a gyro sensor, an acceleration sensor, or an orientation sensor) configured to detect, for example, the position and posture of the head of the user on which the display device 100 is mounted. The display device 100 may also encompass functions of the image generation device 200.

As illustrated in FIG. 2, the mounting member 400 includes, for example, a lens 410 corresponding to each eye E of the user. The lens 410 enlarges an image displayed on the display panel 110 when the HMD is mounted on the user and forms the image on the retina of the eye E of the user. The user visually recognizes the image displayed on the display panel 110 and enlarged through the lens 410. Although FIG. 2 illustrates an example in which one lens is disposed between the eye E of the user and the display panel 110, for example, a plurality of lenses corresponding to each eye of the user may be provided. The display panel 110 may be disposed at a position not in front of the eyes of the user.

In the present embodiment, the display panel 110 is assumed to be a liquid crystal display panel.

In the display device 100 used in the VR system as illustrated in FIG. 1, an image displayed on the display panel 110 is enlarged and formed on the retina of each eye E of the user as illustrated in FIG. 2. Thus, the display panel is desired to have a higher definition. Furthermore, since a displayed video is enlarged, gaps among pixels are likely to appear in a grid shape. Thus, the use of a liquid crystal display panel having a high pixel aperture ratio provides such an advantage that video display can be performed with less grid appearance.

Figure 3:
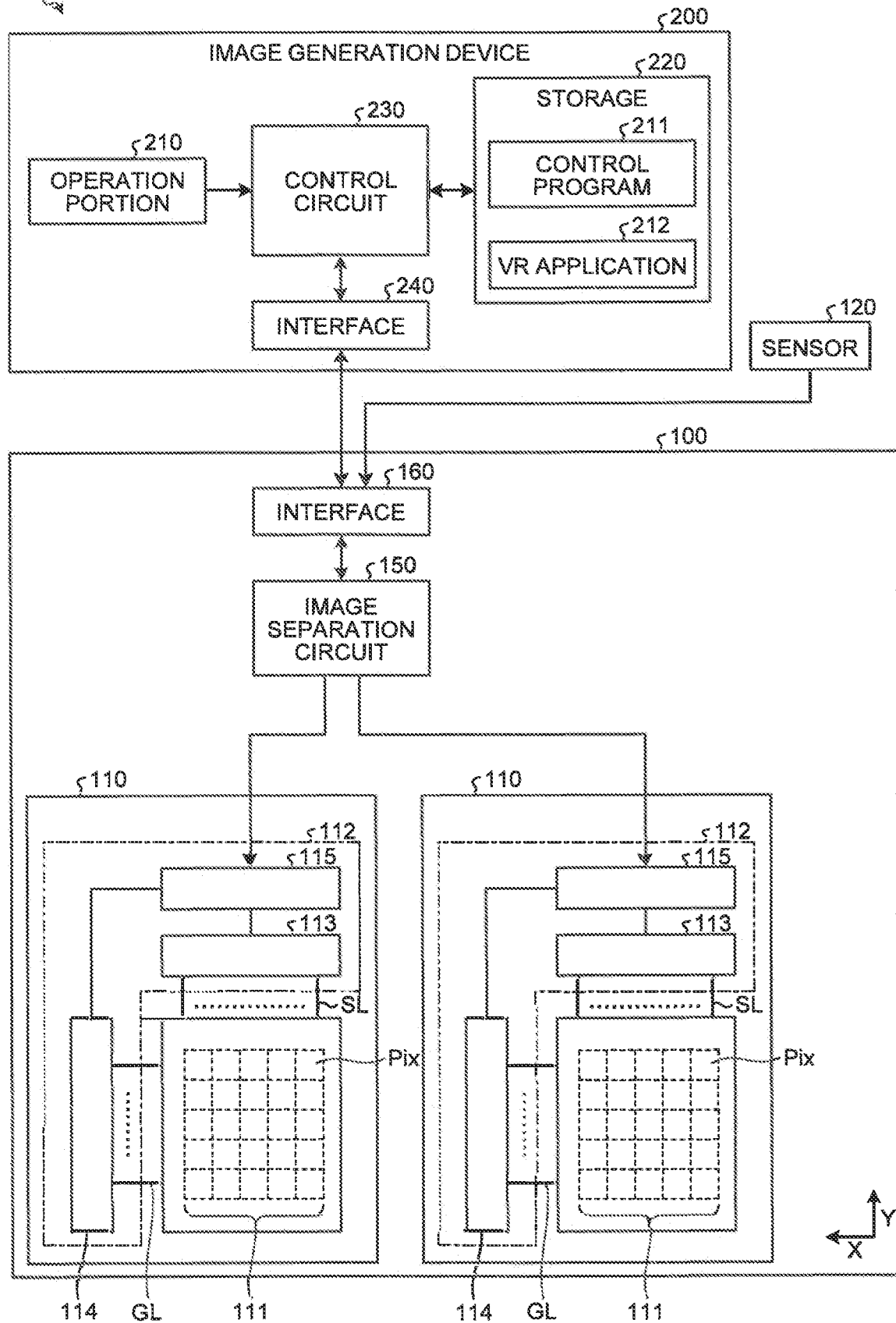
FIG. 3 is a block diagram illustrating an example of the configurations of an image generation device and display devices in the display system illustrated in FIG. 1.

FIG. 3 is a block diagram illustrating an example of the configurations of an image generation device and display devices in the display system illustrated in FIG. 1. As illustrated in FIG. 3, the display device 100 includes two display panels 110, a sensor 120, an image separation circuit 150, and an interface 160.

The display device 100 includes the two display panels 110. One of the two display panels 110 is used as a left-eye display panel 110, and the other is used as a right-eye display panel 110.

Each of the two display panels 110 includes a display region 111 and a display control circuit 112. Each display panel 110 includes a non-illustrated light source device configured to irradiate the display region 111 from behind. Each display region 111 includes a two-dimensional matrix of rows and columns of n×m arranged pixels Pix (n pixels in the row direction (X direction) and m pixels in the column direction (Y direction)). In the present embodiment, the pixel density in each display region 111 is, for example, 806 ppi. FIG. 3 schematically illustrates arrangements of a plurality of pixels Pix, and the detailed arrangement of pixels Pix will be described later.

Each display panel 110 includes scanning lines extending in the X direction and signal lines extending in the Y direction intersecting the X direction. In each display panel 110, the pixels Pix are disposed in regions surrounded by signal lines SL and scanning lines GL. Each pixel Pix includes a switching element (thin film transistor (TFT)) coupled to a signal line SL and a scanning line GL, and pixel electrodes coupled to the switching element. Each scanning line GL is coupled to a plurality of pixels Pix disposed in the direction in which the scanning line GL extends. Each signal line SL is coupled to a plurality of pixels Pix disposed in the direction in which the signal line SL extends.

The display region 111 of one of the two display panels 110 is for the right eye, and the display region 111 of the other display panel 110 is for the left eye. In this example, the display panels 110 include the two display panels 110 for the left and right eyes, but the display device 100 is not limited to a structure including two display panels 110. For example, one display panel 110 may be provided and the display region of the one display panel 110 may be divided into two to display a right-eye image in the right-half region and display a left-eye image in the left-half region.

Each display control circuit 112 includes a driver integrated circuit (IC) 115, a signal line coupling circuit 113, and a scanning line drive circuit 114. The signal line coupling circuit 113 is electrically coupled to the signal lines SL. The driver IC 115 controls the scanning line drive circuit 114 to turn on and off each switching element (for example, TFT) for controlling operation (light transmittance) of the corresponding pixel Pix. The scanning line drive circuit 114 is electrically coupled to the scanning lines GL.

The sensor 120 detects information based on which the orientation of the head of the user can be estimated. For example, the sensor 120 detects information indicating motion of the display device 100, and the display system 1 estimates the orientation of the head of the user on which the display device 100 is mounted based on the information indicating motion of the display device 100.

The sensor 120 detects information based on which the orientation of the line of sight can be estimated by using, for example, at least one of the angle, acceleration, angular velocity, orientation, and distance of the display device 100. As the sensor 120, for example, a gyro sensor, an acceleration sensor, and an orientation sensor can be used. For example, the sensor 120 may detect the angle and angular velocity of the display device 100 by using the gyro sensor. For example, the sensor 120 may detect the direction and magnitude of acceleration applied to the display device 100 by using the acceleration sensor.

For example, the sensor 120 may detect the orientation of the display device 100 by using the orientation sensor. The sensor 120 may detect movement of the display device 100 by using, for example, a distance sensor or a global positioning system (GPS) receiver. The sensor 120 may be any other sensor, such as a light sensor, for detecting the orientation of the head of the user, change of the line of sight, movement, or the like, or may be a combination of a plurality of sensors. The sensor 120 is electrically coupled to the image separation circuit 150 through the interface 160 to be described later.

The image separation circuit 150 receives left-eye image data and right-eye image data fed from the image generation device 200 through the cable 300, feeds the left-eye image data to the display panel 110 configured to display a left-eye image, and feeds the right-eye image data to the display panel 110 configured to display a right-eye image.

The interface 160 includes a connector to which the cable 300 (FIG. 1) is coupled. A signal from the image generation device 200 is input to the interface 160 through the coupled cable 300. The image separation circuit 150 outputs a signal input from the sensor 120 to the image generation device 200 through the interface 160 and an interface 240. The signal input from the sensor 120 includes the above-described information based on which the orientation of the line of sight can be estimated. Alternatively, the signal input from the sensor 120 may be directly output to a control circuit 230 of the image generation device 200 through the interface 160. The interface 160 may be, for example, a wireless communication device and may transmit and receive information to and from the image generation device 200 through wireless communication.

The image generation device 200 includes an operation portion 210, a storage 220, the control circuit 230, and the interface 240.

The operation portion 210 receives an operation from the user. As the operation portion 210, for example, an input device such as a keyboard, a button, and a touch screen can be used. The operation portion 210 is electrically coupled to the control circuit 230. The operation portion 210 outputs information in accordance with the operation to the control circuit 230.

The storage 220 stores computer programs and data. The storage 220 temporarily stores results of processing by the control circuit 230. The storage 220 includes a storage medium. Examples of the storage medium include a ROM, a RAM, a memory card, an optical disk, and a magneto optical disc. The storage 220 may store data of images to be displayed on the display device 100.

The storage 220 stores, for example, a control program 211 and a VR application 212. The control program 211 can provide, for example, functions related to various kinds of control for operating the image generation device 200. The VR application 212 can provide a function to display a VR image on the display device 100. The storage 220 can store various kinds of information input from the display device 100, such as data indicating results of detection by the sensor 120.

The control circuit 230 includes, for example, a micro control unit (MCU) or a central processing unit (CPU). The control circuit 230 can collectively control operation of the image generation device 200. Various kinds of functions of the control circuit 230 are implemented based on control by the control circuit 230.

The control circuit 230 includes, for example, a graphics processing unit (GPU) configured to generate images to be displayed. The GPU generates an image to be displayed on the display device 100. The control circuit 230 outputs the image generated by the GPU to the display device 100 through the interface 240. The control circuit 230 of the image generation device 200 includes the GPU in description of the present embodiment but is not limited thereto. For example, the GPU may be provided in the display device 100 or the image separation circuit 150 of the display device 100. In this case, the display device 100 may acquire data from the image generation device 200, an external electronic apparatus, or the like, and the GPU may generate an image based on the data.

The interface 240 includes a connector to which the cable 300 (refer to FIG. 1) is coupled. A signal from the display device 100 is input to the interface 240 through the cable 300. The interface 240 outputs the signal input from the control circuit 230 to the display device 100 through the cable 300. The interface 240 may be, for example, a wireless communication device and may transmit and receive information to and from the display device 100 through wireless communication.

When the VR application 212 is executed, the control circuit 230 displays an image in accordance with motion of the user (display device 100) on the display device 100. When having detected change of the user (display device 100) while displaying the image on the display device 100, the control circuit 230 changes the image displayed on the display device 100 to an image in the direction of the change. At start of image production, the control circuit 230 produces an image based on a reference viewpoint and a reference line of sight in a virtual space, and when having detected change of the user (display device 100), changes a viewpoint or line of sight for producing a displayed image from the direction of the reference viewpoint or the reference line of sight in accordance with motion of the user (display device 100), and displays an image based on the changed viewpoint or line of sight on the display device 100.

For example, the control circuit 230 detects rightward movement of the head of the user based on a result of detection by the sensor 120. In this case, the control circuit 230 changes a currently displayed image to an image when the line of sight is changed in the right direction. The user can visually recognize an image to the right of the image displayed on the display device 100.

For example, when having detected movement of the display device 100 based on a result of detection by the sensor 120, the control circuit 230 changes an image in accordance with the detected movement. When having detected frontward movement of the display device 100, the control circuit 230 changes the currently displayed image to an image in a case of movement to the front side of the currently displayed image. When having detected backward movement of the display device 100, the control circuit 230 changes the currently displayed image to an image in a case of movement to the back side of the currently displayed image. The user can visually recognize an image in the direction in which the user moves from an image displayed on the display device 100.

Figure 4:
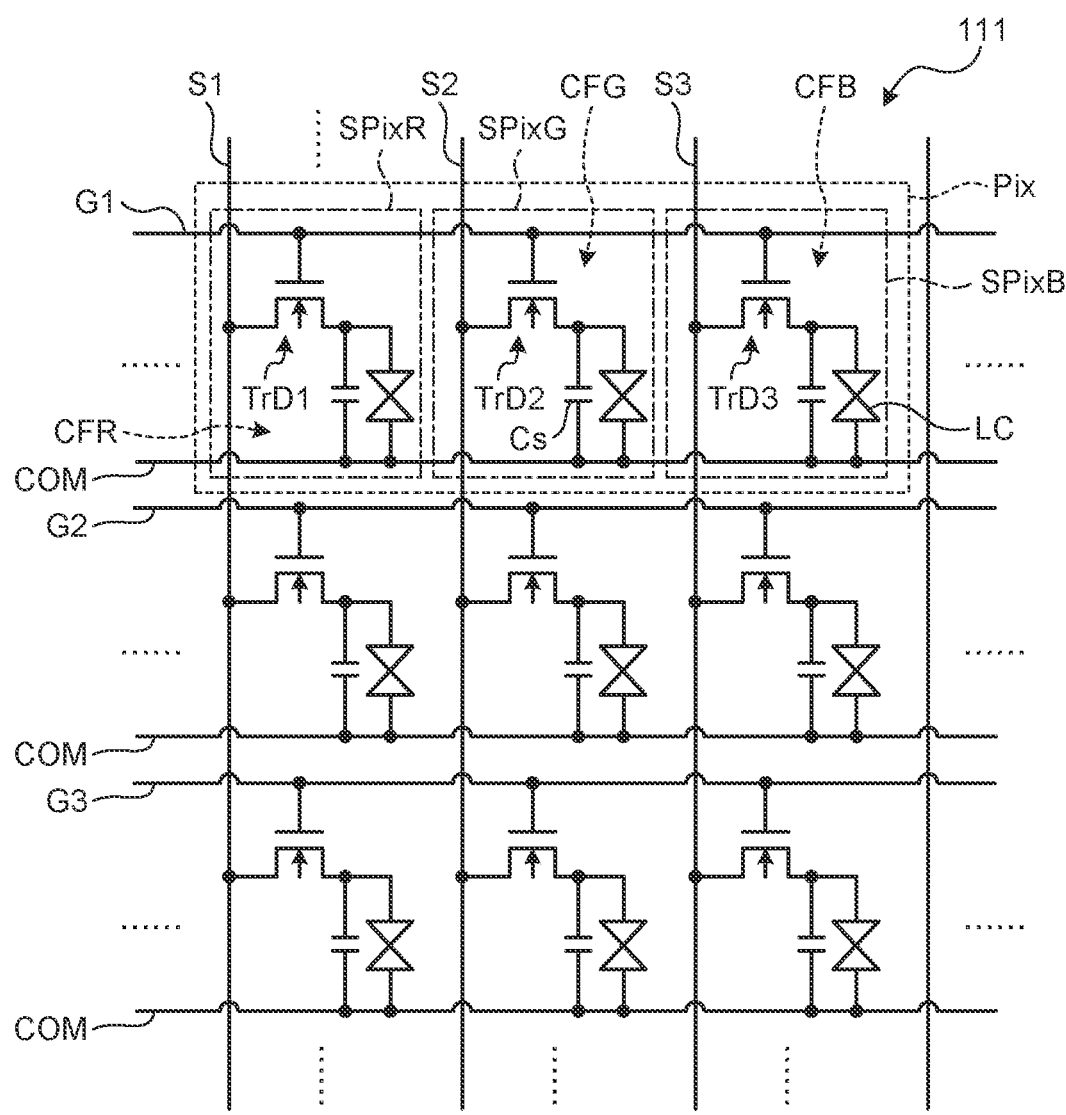
FIG. 4 is a circuit diagram illustrating a display region according to the embodiment.

FIG. 4 is a circuit diagram illustrating each display region according to the embodiment. Hereinafter, the above-described scanning lines GL collectively refer to a plurality of scanning lines G1, G2, and G3. The above-described signal lines SL collectively refer to a plurality of signal lines S1, S2, and S3. In the example illustrated in FIG. 4, the scanning lines GL are orthogonal to the signal lines SL, but the present invention is not limited thereto. For example, the scanning lines GL need not be orthogonal to the signal lines SL.

As illustrated in FIG. 4, in the present disclosure, each pixel Pix includes, for example, a sub pixel SPixR for displaying red (first color; R), a sub pixel SPixG for displaying green (second color; G), and a sub pixel SPixB for displaying blue (third color; B). For example, switching elements TrD1, TrD2, and TrD3 of the sub pixels SPixR, SPixG, and SPixB, the signal lines SL, and the scanning lines GL are formed in each display region 111. The signal lines S1, S2, and S3 are wires for supplying pixel signals to pixel electrodes PE1, PE2, and PE3 (refer to FIG. 6). The scanning lines G1, G2, and G3 are wires for supplying gate signals that drive the switching elements TrD1, TrD2, and TrD3. The sub pixels SPixR, SPixG, and SPixB are each also referred to as a sub pixel SPix.

The sub pixels SPixR, SPixG, and SPixB include the respective switching elements TrD1, TrD2, and TrD3 and capacitors of a liquid crystal layer LC. The switching elements TrD1, TrD2, and TrD3 are each constituted by a thin film transistor, and in this example, constituted by an n-channel metal oxide semiconductor (MOS) TFT. A sixth insulating film 16 (refer to FIG. 6) is provided between the pixel electrodes PE1, PE2, and PE3 and a common electrode COM to be described later, and holding capacitors Cs illustrated in FIG. 4 are formed by these components.

Color filters CFR, CFG, and CFB illustrated in FIG. 4 are periodically arranged color regions colored in, for example, three colors of red (first color; R), green (second color; G), and blue (third color; B). The above-described sub pixels SPixR, SPixG, and SPixB illustrated in FIG. 4 are associated with a set of color regions in the three colors of R, G, and B. The sub pixels SPixR, SPixG, and SPixB corresponding to the color regions in the three colors are grouped as a set of pixels Pix. The color filters may include color regions in four or more colors.

Figure 5:
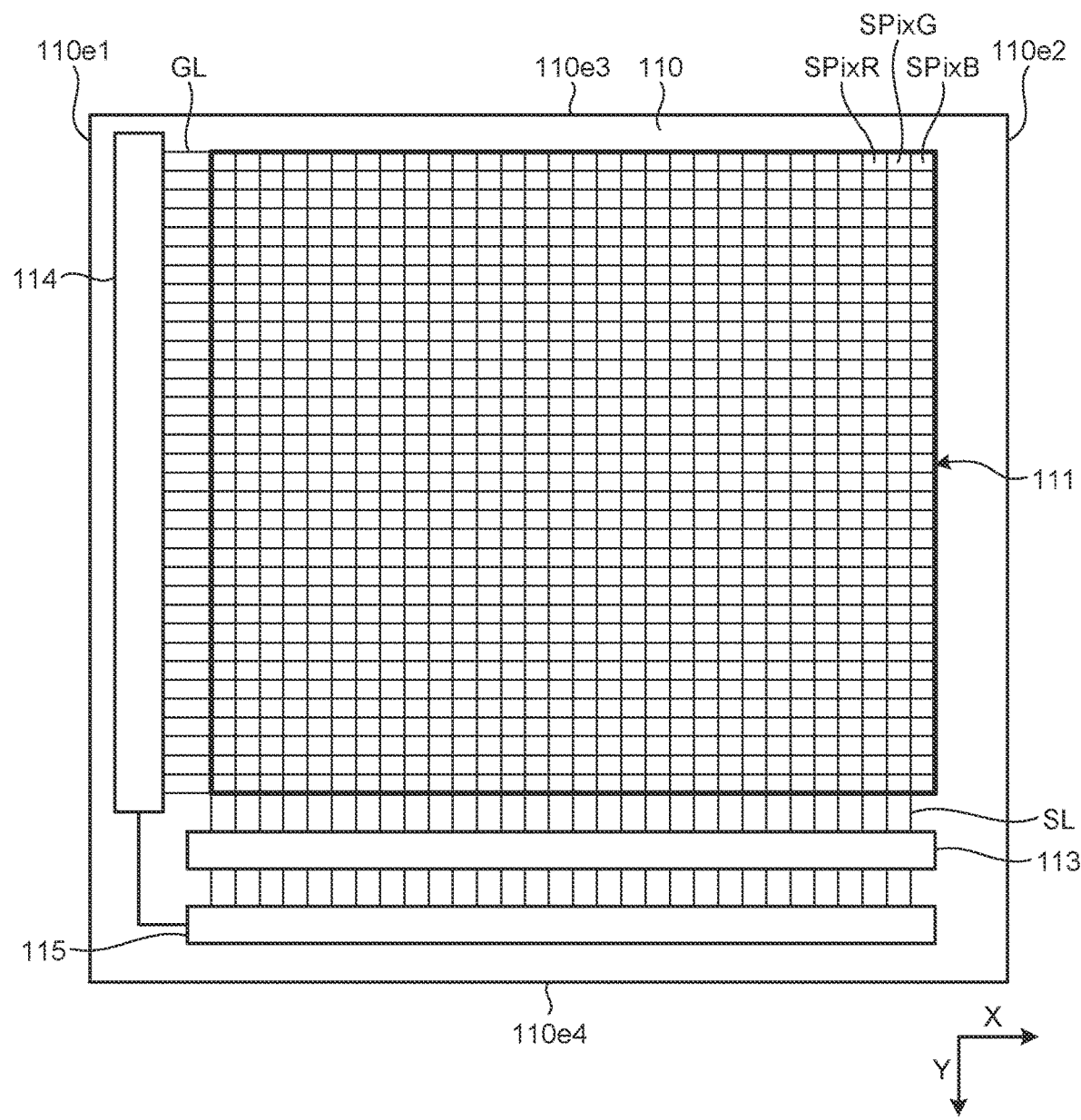
FIG. 5 is a schematic diagram illustrating an example of the display panel according to the embodiment.
Figure 6:
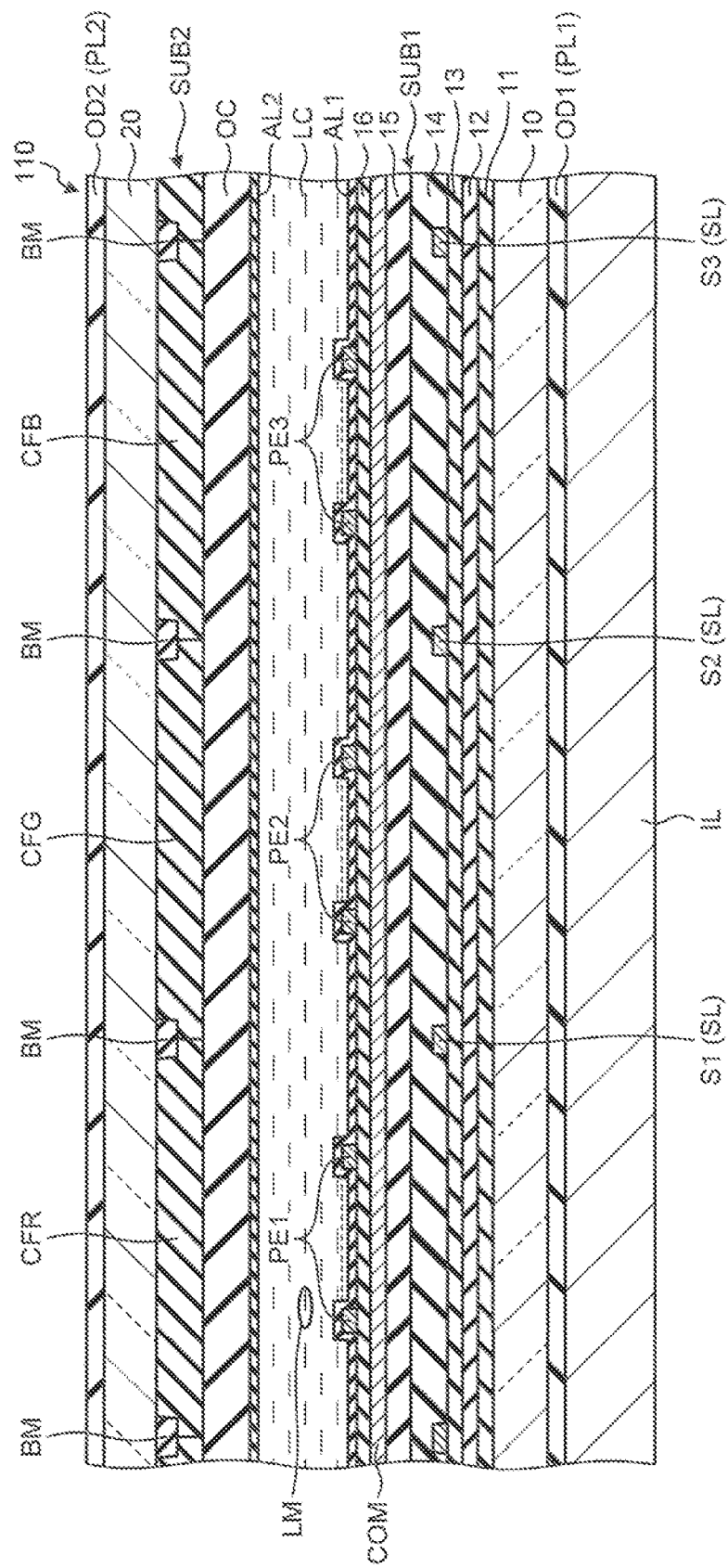
FIG. 6 is a sectional view schematically illustrating a section of the display panel according to the embodiment.

FIG. 5 is a schematic diagram illustrating an example of each display panel according to the embodiment. FIG. 6 is a sectional view schematically illustrating a section of each display panel according to the embodiment.

As illustrated in FIG. 5, each display panel 110 has a side 110e1, a side 110e2, a side 110e3, and a side 110e4 of a substrate end part. A region between each of the side 110e1, the side 110e2, the side 110e3, and the side 110e4 of the substrate end part of the display panel and the corresponding display region 111 is referred to as a peripheral region.

The corresponding scanning line drive circuit 114 is disposed in the peripheral region between the side 110e1 of the substrate end part of the display panel 110 and the display region 111. The corresponding signal line coupling circuit 113 is disposed in the peripheral region between the side 110e4 of the substrate end part of the display panel 110 and the display region 111. The corresponding driver IC 115 is disposed in the peripheral region between the side 110e4 of the substrate end part of the display panel 110 and the display region 111. In the present embodiment, the side 110e3 and the side 110e4 of the substrate end part of the display panel 110 are parallel to the X direction. The side 110e1 and the side 110e2 of the substrate end part of the display panel 110 are parallel to the Y direction.

In the example illustrated in FIG. 5, the signal lines SL extend in parallel to the Y direction and the scanning lines GL extend in parallel to the X direction. As illustrated in FIG. 5, in the present disclosure, the direction in which the scanning lines GL extend is orthogonal to the direction in which the signal lines SL extend.

The following describes a sectional structure of each display panel 110 with reference to FIG. 6. In FIG. 6, an array substrate SUB1 is based on a translucent first insulation substrate 10 such as a glass substrate or a resin substrate. The array substrate SUB1 includes a first insulating film 11, a second insulating film 12, a third insulating film 13, a fourth insulating film 14, a fifth insulating film 15, the sixth insulating film 16, the signal lines S1 to S3, the pixel electrodes PE1 to PE3, the common electrode COM, and a first alignment film AL1 on a side on which the first insulation substrate 10 faces a counter substrate SUB2 of the first insulation substrate 10. In the following description, the direction from the array substrate SUB1 toward the counter substrate SUB2 is referred to as upward or simply up.

The first insulating film 11 is positioned on the first insulation substrate 10. The second insulating film 12 is positioned on the first insulating film 11. The third insulating film 13 is positioned on the second insulating film 12. The signal lines S1 to S3 are positioned on the third insulating film 13. The fourth insulating film 14 is positioned on the third insulating film 13 and covers the signal lines S1 to S3.

Wires may be disposed on the fourth insulating film 14 as necessary. The wires are covered by the fifth insulating film 15. The wires are omitted in the present embodiment. The first insulating film 11, the second insulating film 12, the third insulating film 13, and the sixth insulating film 16 are formed of a translucent inorganic material such as silicon oxide or silicon nitride. The fourth insulating film 14 and the fifth insulating film 15 are formed of a translucent resin material and have thicknesses larger than those of the other insulating films formed of the inorganic material. However, the fifth insulating film 15 may be formed of an inorganic material.

The common electrode COM is positioned on the fifth insulating film 15. The common electrode COM is covered by the sixth insulating film 16. The sixth insulating film 16 is formed of a translucent inorganic material such as silicon oxide or silicon nitride.

The pixel electrodes PE1 to PE3 are positioned on the sixth insulating film 16 and face the common electrode COM through the sixth insulating film 16. The pixel electrodes PE1 to PE3 and the common electrode COM are formed of a translucent conductive material such as indium tin oxide (ITO) or indium zinc oxide (IZO). The pixel electrodes PE1 to PE3 are covered by the first alignment film AL1. The first alignment film AL1 covers the sixth insulating film 16 as well.

The counter substrate SUB2 is based on a translucent second insulation substrate 20 such as a glass substrate or a resin substrate. The counter substrate SUB2 includes a light-shielding layer BM, the color filters CFR, CFG, and CFB, an overcoat layer OC, and a second alignment film AL2 on a side on which the second insulation substrate 20 faces the array substrate SUB1.

As illustrated in FIG. 6, the light-shielding layer BM is positioned on the side on which the second insulation substrate 20 faces the array substrate SUB1. The light-shielding layer BM defines the sizes of openings facing the respective pixel electrodes PE1 to PE3. The light-shielding layer BM is formed of a black resin material or a light-shielding metallic material.

The color filters CFR, CFG, and CFB are positioned on the side on which the second insulation substrate 20 faces the array substrate SUB1, and end parts of each color filter overlap the light-shielding layer BM. The color filter CFR faces the pixel electrode PE1. The color filter CFG faces the pixel electrode PE2. The color filter CFB faces the pixel electrode PE3. In an example, the color filters CFR, CFG, and CFB are formed of resin materials colored in blue, red, and green, respectively.

The overcoat layer OC covers the color filters CFR, CFG, and CFB. The overcoat layer OC is formed of a translucent resin material. The second alignment film AL2 covers the overcoat layer OC. The first alignment film AL1 and the second alignment film AL2 are formed of, for example, a material having horizontal orientation.

As described above, the counter substrate SUB2 includes the light-shielding layer BM and the color filters CFR, CFG, and CFB. The light-shielding layer BM is disposed in regions facing wire parts such as the scanning lines G1, G2, and G3, the signal lines S1, S2, and S3, contact portions PA1, PA2, and PA3, the switching elements TrD1, TrD2, and TrD3 illustrated in FIG. 4.

The counter substrate SUB2 includes the color filters CFR, CFG, and CFB in three colors in FIG. 6, but may include color filters in four or more colors including color filters in other colors such as white, transparent, yellow, magenta, and cyan, which are different from blue, red, and green. The color filters CFR, CFG, and CFB may be included in the array substrate SUB1.

The color filters CF are provided in the counter substrate SUB2 in FIG. 6, but what is called a color-filter-on-array (COA) structure including the color filters CF in the array substrate SUB1 may be employed.

The array substrate SUB1 and the counter substrate SUB2 described above are disposed such that the first alignment film AL1 and the second alignment film AL2 face each other.

The liquid crystal layer LC is encapsulated between the first alignment film AL1 and the second alignment film AL2. The liquid crystal layer LC is made of a negative liquid crystal material having negative dielectric constant anisotropy or a positive liquid crystal material having positive dielectric constant anisotropy.

The array substrate SUB1 faces a backlight unit IL, and the counter substrate SUB2 is positioned on a display surface side. The backlight unit IL is applicable in various kinds of forms, but description of a detailed structure thereof is omitted.

A first optical element OD1 including a first polarization plate PL1 is disposed on the outer surface of the first insulation substrate 10 or its surface facing the backlight unit IL. A second optical element OD2 including a second polarization plate PL2 is disposed on the outer surface of the second insulation substrate 20 or its surface on an observation position side. A first polarization axis of the first polarization plate PL1 and a second polarization axis of the second polarization plate PL2 are in, for example, a cross Nicol positional relation on an X-Y plane. The first optical element OD1 and the second optical element OD2 may each include another optical functional element such as a wave plate.

For example, in a state in which no voltage is applied to the liquid crystal layer LC when the liquid crystal layer LC is a negative liquid crystal material, the long axis of each liquid crystal molecule LM is initially oriented in the X direction on an X-Y plane. In a state in which voltage is applied to the liquid crystal layer LC, in other words, in an "on" state in which an electric field is formed between the pixel electrodes PE1 to PE3 and the common electrode COM, the orientation state of the liquid crystal molecule LM changes due to influence of the electric field. In the "on" state, the polarization state of incident linearly polarized light changes in accordance . . . with the orientation state of the liquid crystal molecule LM as the light passes through the liquid crystal layer LC.

Typically in the HMD, an image displayed on each display panel 110 is enlarged through the corresponding lens 410 and observed. Since the lens 410 is in proximity to the display panel 110, geometric image distortion (hereinafter also simply referred to as "lens distortion") due to aberrations of the lens 410 occurs to an image observed by the user. It is difficult to prevent aberrations of the lens 410 because of weight and size limitations of the HMD mounted on the head. Thus, the display system 1 performs image deformation processing to compensate the lens distortion on an image (hereinafter also referred to as an "input image") input to the display system 1, thereby generating an image to be displayed on each display panel 110.

Figure 7:
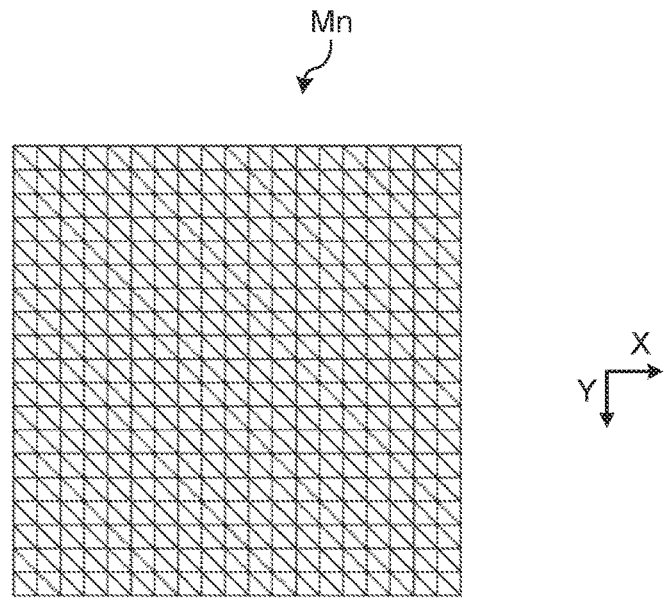
FIG. 7 is a diagram illustrating an example of the shape of an image to be subjected to image deformation processing in the display system according to the embodiment.
Figure 8:
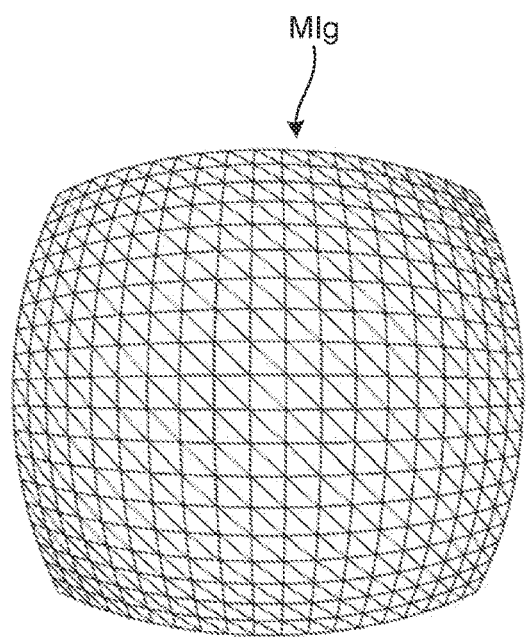
FIG. 8 is a diagram illustrating an example of the shape of the image subjected to the image deformation processing in the display system according to the embodiment.

FIG. 7 is a diagram illustrating an example of the shape of an image to be subjected to the image deformation processing in the display system according to the embodiment. FIG. 8 is a diagram illustrating an example of the shape of the image subjected to the image deformation processing in the display system according to the embodiment.

In FIG. 7, an image Mn to be visually recognized by the user is constituted by a plurality of pixels disposed in a matrix of rows and columns in the X and Y directions. The control circuit 230 illustrated in FIG. 3 generates an image MIg (FIG. 8) by performing the image deformation processing on the image Mn illustrated in FIG. 7. In the present disclosure, what is called pincushion distortion occurs to each lens 410 due to observation of an object in proximity. To compensate lens distortion due to the pincushion distortion, barrel distortion as illustrated in FIG. 8 is provided to the image Mn input to the display system 1. The shape of the image MIg subjected to the image deformation processing, which is illustrated in FIG. 8, is exemplary and the present invention is not limited to the shape illustrated in FIG. 8.

The image deformation processing in the display system 1 is performed by using texture mapping typically used in image processing. The following briefly describes the image deformation processing based on texture mapping.

In the example illustrated in FIG. 7, a polygon mesh constituted by a plurality of triangular polygons disposed in a mesh shape is placed over the image Mn to be visually recognized by the user. In FIG. 7, the polygon mesh is constituted by a set of 19 rectangles of the same size in each of the X and Y directions, the rectangles being adjacent to each other and having a boundary at common coordinates. Each rectangle is formed of two polygons. Thus, the polygon mesh illustrated in FIG. 7 is formed of 19×19×2=722 polygons. As the number of polygons constituting the polygon mesh increases, correctness of the distorted shape of the image MIg subjected to the image deformation processing can improve.

Figure 10:
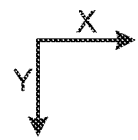
FIG. 10 is a diagram illustrating virtual positions of data definition points illustrated in FIG. 9.

FIG. 9 is a diagram illustrating an example of image data input to the display system according to the embodiment. FIG. 10 is a diagram illustrating virtual positions of data definition points illustrated in FIG. 9. Color data RN, M representing the pixel intensity of red (first color; R), color data GN, M representing the pixel intensity of green (second color; G), and color data BN, M representing the pixel intensity of blue (third color; B) (N is an integer of 0 to n−1 and M is an integer of 0 to m−1) are defined for each of data definition points P0, 0, P1, 0, Pn−1, m−1 illustrated in FIG. 10. In other words, the input image includes a plurality of data definition points virtually disposed in a matrix of rows and columns in the X and Y directions, and information of color and brightness is recorded for each data definition point. In the example illustrated in FIG. 9, brightness and color are recorded in the form of the intensities of the three primary colors of R, G, and B. Data of each data definition point is not limited to color data but may be luminance and color difference data.

Figure 11:
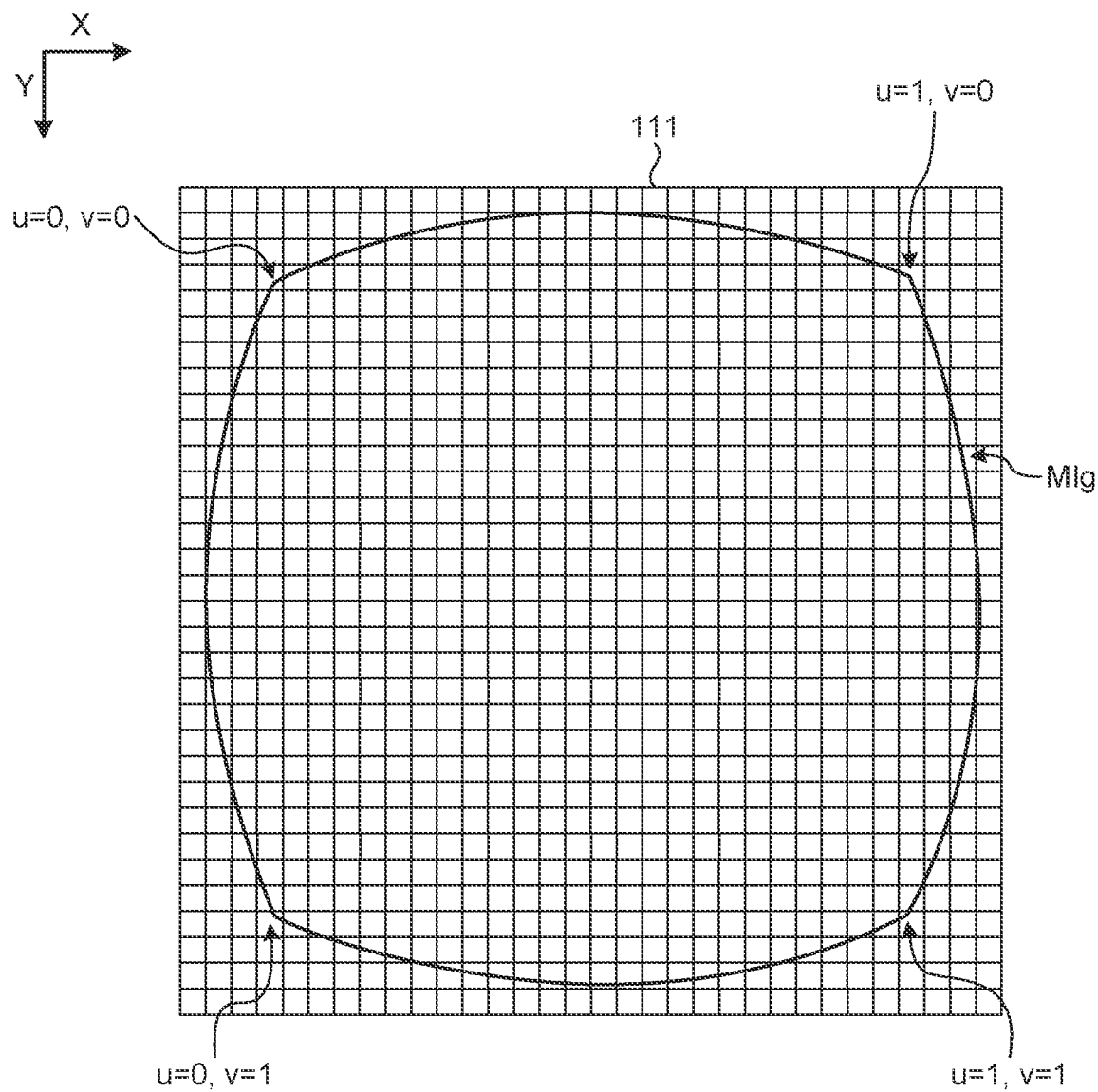
FIG. 11 is a diagram illustrating the positional relation of the image subjected to the image deformation processing, the positional relation corresponding to the display region of the display system according to the embodiment.

The data definition points P0, 0, P1, 0, . . . , Pn−1, m−1 illustrated in FIG. 10 move when the image Mn illustrated in FIG. 7 is distorted into the shape of the image MIg illustrated in FIG. 8 through the image deformation processing based on texture mapping using a polygon mesh. FIG. 11 is a diagram illustrating the positional relation of an image subjected to the image deformation processing, the positional relation corresponding to each display region of the display system according to the embodiment. The quadrille figure in FIG. 11 illustrates the display region 111 of the display panel 110.

In the present disclosure, two-dimensional numbers indicating a data position on an image (texture) of image data constituting texture are referred to as "texture coordinates". The range of a value in the texture coordinate system is normalized with the number of n−1 in the X direction and the number of m−1 in the Y direction in an XY coordinate system illustrated in FIG. 10 and normalized to a number of 0 to 1. The unit of PN, M illustrated in FIG. 10, in other words, data constituting texture is referred to as "texel".

A coordinate system that defines texture coordinates is assumed to be a uv coordinate system. When k represents the position of a texel in the u direction, l represents the position thereof in the v direction, q represents the number of texels in the u direction, and p represents the number of texels in the v direction, the correlation between a position in the uv coordinate system and the position of a texel can be expressed by Expressions (1) and (2) below.

$$k=qu \quad (1)$$

$$l=pv \quad (2)$$

In the present disclosure, processing in accordance with the pixel structure of each display panel 110 is performed in the above-described image deformation processing. Specifically, the control circuit 230 of the image generation device 200 generates the pixel values of all sub pixels SPix of the display panel 110 and transmits the pixel values to the display device 100 through the interface 240. Accordingly, image conversion processing such as resolution conversion processing and pixel value conversion processing in accordance with the pixel structure of the display panel 110 can be omitted at the display panel 110.

The following describes the image deformation processing in the present disclosure in detail.

Through the above-described image deformation processing based on texture mapping, a texture coordinate $(u_c, v_c)$ in the image Mn yet to be subjected to the image deformation processing is obtained, the texture coordinate corresponding to a pixel position (x, y) in the image MIg subjected to the image deformation processing. The texture coordinate $(u_c, v_c)$ has no concept as a sub pixel and is a coordinate corresponding to a typical position (x, y) of a pixel Pix. Thus, the positions of the sub pixels SPixR, SPixG, and SPixB are relatively different from a typical position of a pixel Pix. The texture coordinate of each sub pixel SPix of the display panel 110 can be obtained by applying correction for the sub pixel SPix to the texture coordinate $(u_c, v_c)$.

A texture coordinate $(u_Q(x, y), v_Q(x, y))$ to which correction for each sub pixel SPix of the display panel 110 is applied can be expressed by Expressions (3) and (4) below. In Expressions (3) and (4) below, Q is R, G, and B. Specifically, a coordinate $(u_R(x, y), v_R(x, y))$ represents the texture coordinate of the sub pixel SPixR, a coordinate $(u_G(x, y), v_G(x, y))$ represents the texture coordinate of the sub pixel SPixG, and a coordinate $(u_U(x, y), v_B(x, y))$ represents the texture coordinate of the sub pixel SPixB.

$$u_Q(x,y)=u_{cQ}(x,y)+\Delta u_{sQ}(x,y) \quad (3)$$

$$v_Q(x,y)=v_{cQ}(x,y)+\Delta v_{sQ}(x,y) \quad (4)$$

In Expressions (3) and (4) above, the texture coordinate $(u_{cQ}(x, y), v_{cQ}(x, y))$ is constant $(u_c(x, y)=u_{cR}(x, y)=u_{cG}(x, y)=u_{cB}(x, y))$ among the sub pixels SPix when correction of chromatic aberration due to the corresponding lens 410 is not performed at the sub pixels SPixR, SPixG, and SPixB. A texture coordinate difference value $(\Delta u_{sQ}(x, y), \Delta v_{sQ}(x, y))$ represents the difference value of each of the sub pixels SPixR, SPixG, and SPixB from the texture coordinate $(u_c, v_c)$.

Figure 12A:
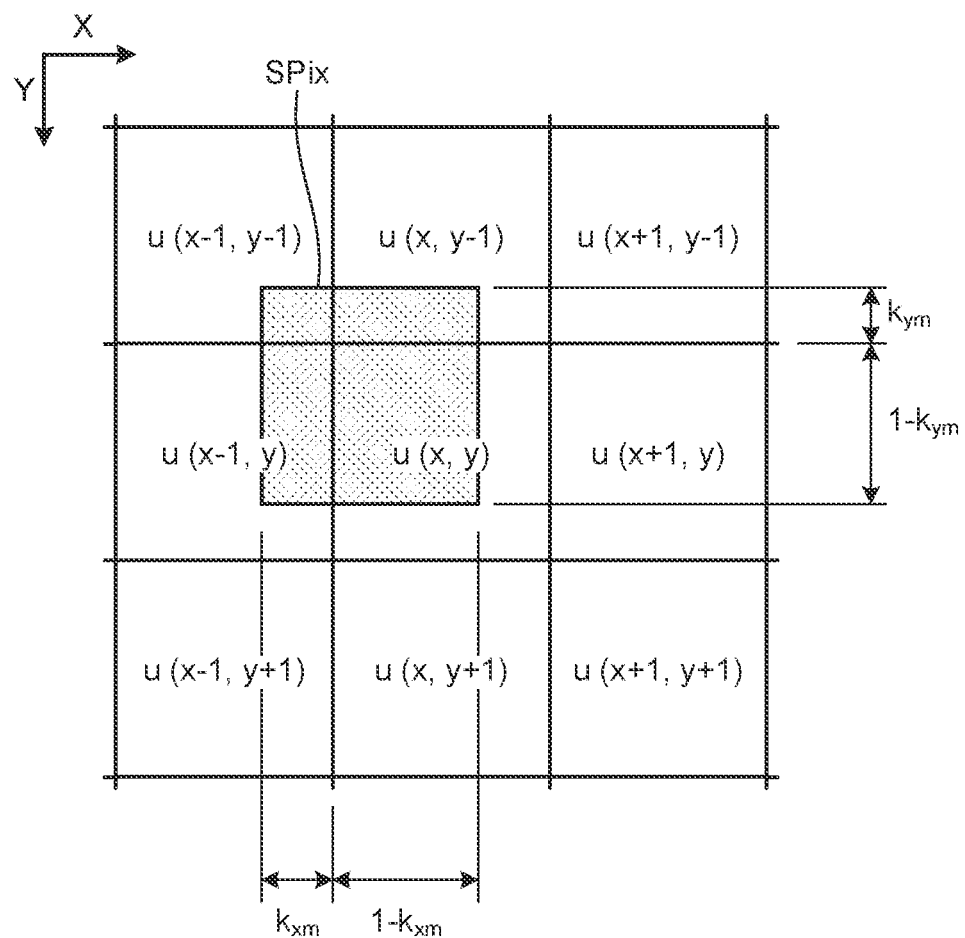
FIG. 12A is a diagram illustrating the positional relation of each sub pixel with a typical position of a pixel.
Figure 12B:
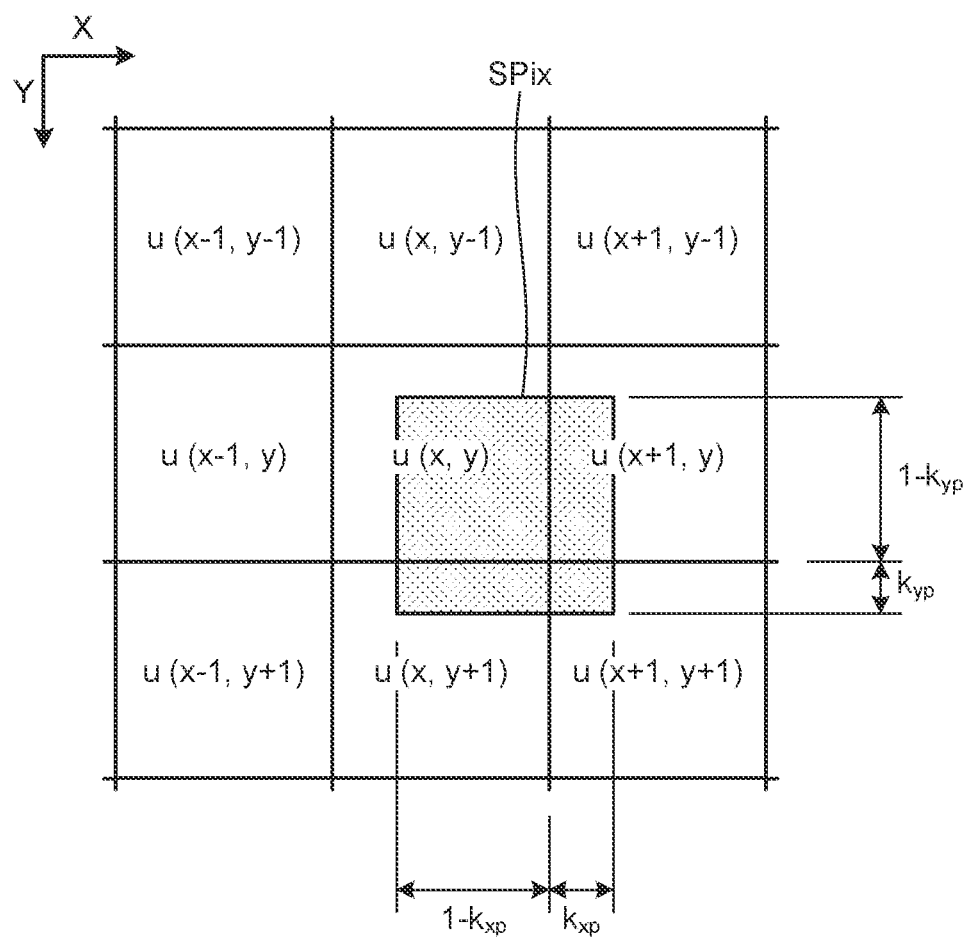
FIG. 12B is a diagram illustrating the positional relation of each sub pixel with a typical position of a pixel.

FIGS. 12A and 12B are diagrams illustrating the positional relation of each sub pixel with a typical position of a pixel. FIGS. 12A and 12B illustrate the shift of the position of a sub pixel SPix from a typical position u(x, y) of a pixel Pix. In the example illustrated in FIG. 12A, the sub pixel SPix is shifted on the negative side from the typical position u (x, y) of the pixel Pix. In the example illustrated in FIG. 12B, the sub pixel SPix is shifted on the positive side from the typical position u (x, y) of the pixel Pix.

Four coefficients $k_{xp}$, $k_{xm}$, $k_{yp}$, and $k_{ym}$ illustrated in FIGS. 12A and 12B represent shift amounts when the pixel width is set to 1, and have values different among the sub pixels SPixR, SPixG, and SPixB.

As in the case of Expressions (3) and (4) above, a texture coordinate $(u_{sQ}(x, y), v_{sQ}(x, y))$ where Q=R, G, and B can be expressed by Expressions (5) and (6) below through two-dimensional linear interpolation using the above-described four coefficients $k_{xp}$, $k_{xm}$, $k_{yp}$, and $k_{ym}$. In Expressions (5) and (6) below, Q is R, G, and B. Specifically, for example, the coefficient $k_{xp}$ for the sub pixel SPixR is expressed as $k_{xpR}$. For example, the coefficient $k_{xp}$ for the sub pixel SPixG is expressed as $k_{xpG}$. For example, the coefficient kw for the sub pixel SPixB is expressed as $k_{xpB}$. This is the same for the other coefficients.

$$u_{sQ}(x, y) = \begin{bmatrix} k_{ypQ} \\ (1 - k_{ypQ})(1 - k_{ymQ}) \\ k_{ymQ} \end{bmatrix} \quad (5)$$

$$\begin{bmatrix} u_{cQ}(x+1, y+1) & u_{cQ}(x, y+1) & u_{cQ}(x-1, y+1) \\ u_{cQ}(x+1, y) & u_{cQ}(x, y) & u_{cQ}(x-1, y) \\ u_{cQ}(x+1, y-1) & u_{cQ}(x, y-1) & u_{cQ}(x-1, y-1) \end{bmatrix}$$

$$\begin{bmatrix} k_{xpQ} \\ (1 - k_{xpQ})(1 - k_{xmQ}) \\ k_{xmQ} \end{bmatrix}$$

$$v_{sQ}(x, y) = \begin{bmatrix} k_{ypQ} \\ (1 - k_{ypQ})(1 - k_{ymQ}) \\ k_{ymQ} \end{bmatrix} \quad (6)$$

$$\begin{bmatrix} v_{cQ}(x+1, y+1) & v_{cQ}(x, y+1) & v_{cQ}(x-1, y+1) \\ v_{cQ}(x+1, y) & v_{cQ}(x, y) & v_{cQ}(x-1, y) \\ v_{cQ}(x+1, y-1) & v_{cQ}(x, y-1) & v_{cQ}(x-1, y-1) \end{bmatrix}$$

$$\begin{bmatrix} k_{xpQ} \\ (1 - k_{xpQ})(1 - k_{xmQ}) \\ k_{xmQ} \end{bmatrix}$$

When the center coordinate of one of the sub pixels SPixR, SPixG, and SPixB or the pixel Pix is set as a coordinate $(u_c(x, y), v_c(x, y))$ as a representative value, the texture coordinate difference value $(\Delta u_{sQ}(x, y), \Delta v_{sQ}(x, y))$ can be expressed by Expressions (7) and (8) below.

$$\Delta u_{sQ}(x,y)=u_{sQ}(x,y)-u_c(x,y) \quad (7)$$

$$\Delta v_{sQ}(x,y)=v_{sQ}(x,y)-v_c(x,y) \quad (8)$$

When the chromatic aberration due to the lens 410 is not corrected, Expressions (9) and (10) below are obtained for the sub pixel SPixG as a representative value.

$$u_c(x,y)=u_{cG}(x,y) \quad (9)$$

$$v_c(x,y)=v_{cG}(x,y) \quad (10)$$

When the chromatic aberration due to the lens 410 is corrected, two methods can be employed. In the first method, the shape of the polygon mesh for obtaining the texture coordinate $(u_c, v_c)$ is reflected onto and differentiated among the sub pixels SPixR, SPixG, and SPixB in accordance with the chromatic aberration due to the lens 410, and accordingly, a texture image is mapped with reduced chromatic aberration in accordance with the image magnification of each of the sub pixels SPixR, SPixG, and SPixB of the lens 410. In other words, the coordinate $(u_{cQ}(x, y), v_{cQ}(x, y))$ is obtained for each of the sub pixels SPixR, SPixG, and SPixB.

In the second method of correcting the chromatic aberration due to the lens 410, a correction coefficient of the image magnification is applied for each of the sub pixels SPixR, SPixG, and SPixB. The following describes the second method of correcting the chromatic aberration due to the lens 410.

Figure 13:
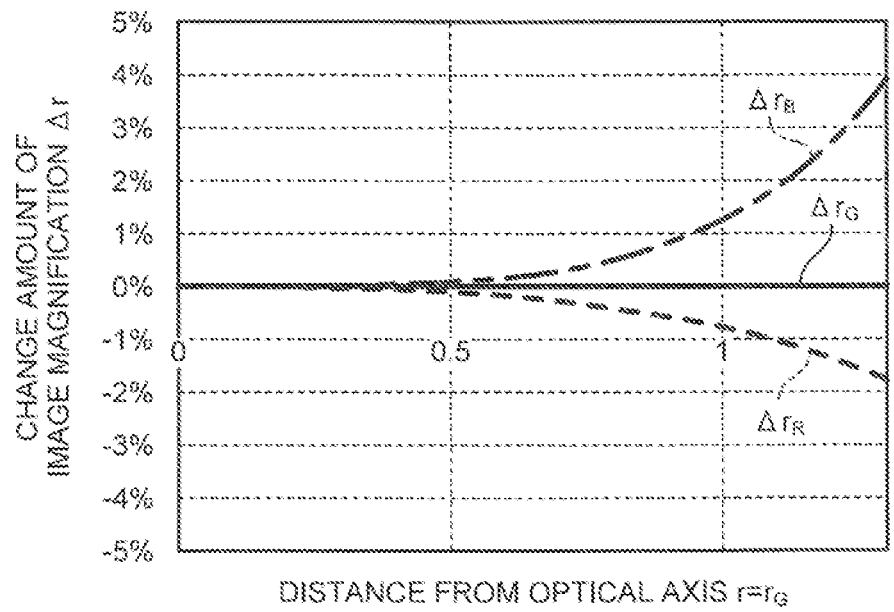
FIG. 13 is a diagram illustrating an example of the chromatic aberration characteristic of a lens, illustrating the change amount of the image magnification for each sub pixel with the distance from the optical axis of the lens.
Figure 14:
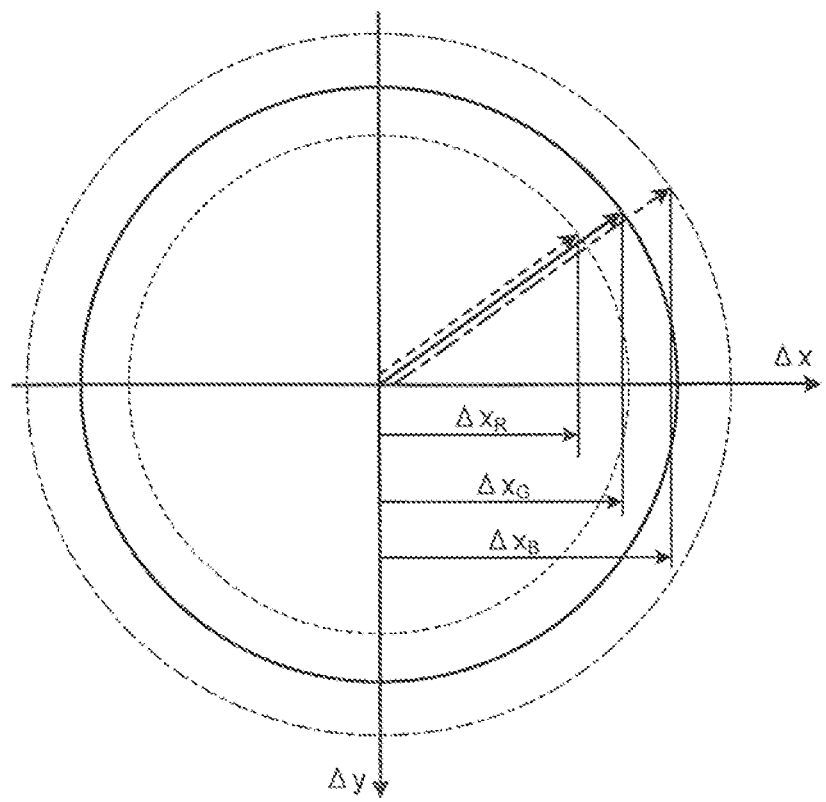
FIG. 14 is a diagram illustrating the distance from the optical axis of the lens to the sub pixel.

When the chromatic aberration due to the lens 410 is considered, it is needed to first obtain a pixel position at which the difference in the image magnification due to the chromatic aberration due to the lens 410 is to be compensated. FIG. 13 is a diagram illustrating an example of the chromatic aberration characteristic of a lens, illustrating the change amount of the image magnification of each sub pixel with the distance from the optical axis of the lens. FIG. 14 is a diagram illustrating the distance from the optical axis of the lens to the sub pixel.

The difference in the image magnification of the lens among colors can be expressed as, for example, a change amount Δr of the image magnification with a distance r from the optical axis of the lens as illustrated in FIG. 13. In FIG. 13, a change amount $\Delta r_R$ of the image magnification for the sub pixel SPixR and a change amount $\Delta r_B$ of the image magnification for the sub pixel SPixB are illustrated with the sub pixel SPixG as a reference ($\Delta r_G=0$).

Typically, the change amount $\Delta r_R$ of the image magnification for the sub pixel SPixR, the change amount $\Delta r_G$ of the image magnification for the sub pixel SPixG, and the change amount $\Delta r_B$ of the image magnification for the sub pixel SPixB are generated due to dispersion of the refractive index of the lens and increase as the distance r from the optical axis increases. As illustrated in FIG. 13, with the sub pixel SPixG as a reference ($\Delta r_G=0$), the change amount $\Delta r_B$ of the image magnification for the sub pixel SPixB typically has a positive value and the change amount $\Delta r_R$ of the image magnification for the sub pixel SPixR typically has a negative value.

When a predetermined pixel Pix is considered and the position of a pixel Pix on the display panel 110 is denoted by $x_{lens\_c}/y_{lens\_c}$, a distance $r_c$ from a position $x_{lens0}$, $y_{lens0}$ of the optical axis of the lens 410 to the pixel on the display panel 110 can be expressed by Expressions (11), (12), and (13) below.

$$\Delta x_{lens\_c} = x_{lens\_c} - x_{lens0} \quad (11)$$

$$\Delta y_{lens\_c} = y_{lens\_c} - y_{lens0} \quad (12)$$

$$r_c = \sqrt{(\Delta x_{lens\_c}^2 + \Delta y_{lens\_c}^2)} \quad (13)$$

As expressed in Expression (14) below, with the sub pixel SPixG of the pixel Pix as a reference ($r_G=r_c$), a distance IR from the position $x_{lens0}$, $y_{lens0}$ of the optical axis of the lens 410 on the display panel 110 to an image of the sub pixel SPixR and a distance Is from the position $x_{lens0}$, $y_{lens0}$ of the optical axis of the lens 410 on the display panel 110 to an image of the sub pixel SPixB can be expressed by Expressions (15) and (16) below, respectively.

$$r_G = r_c \quad (14)$$

$$r_R = r_c \times (1 + \Delta r_R(r_c)) \quad (15)$$

$$r_B = r_c \times (1 + \Delta r_B(r_c)) \quad (16)$$

As described above, with the sub pixel SPixG as a reference ($\Delta r_G=0$), the change amount $\Delta r_B$ of the image magnification for the sub pixel SPixB typically has a positive value, and the change amount $\Delta r_R$ of the image magnification for the sub pixel SPixR typically has a negative value. Thus, the positions of the sub pixels SPixR, SPixG, and SPixB on the display panel 110 are shifted.

An on-image position at which sub-pixel data to be input to the sub pixel SPixR exists corresponds to image data at the position of an image displayed with a shift due to the chromatic aberration of the lens and can be approximated to a relative position $\Delta x_{comp\_R}$, $\Delta y_{comp\_R}$ obtained by correcting the distance from the optical axis of the lens in accordance with the magnification, as expressed in Expressions (17) and (18) below.

$$\Delta x_{comp\_R} = \Delta x_{lens\_c} \times (r_R/r_c) \quad (17)$$
$$= \Delta x_{lens\_c} \times (1 + \Delta r_R(r_c))$$

$$\Delta y_{comp\_R} = \Delta y_{lens\_c} \times (r_R/r_c) \quad (18)$$
$$= \Delta y_{lens\_c} \times (1 + \Delta r_R(r_c))$$

An on-image position $x_{comp\_R}$, $y_{comp\_R}$ at which sup-pixel data to be input to the sub pixel SPixR on the display panel 110 exists is expressed by Expressions (19) and (20) below by using the position $x_{lens0}$, $y_{lens0}$ of the optical axis of the lens 410 on the display panel 110.

$$x_{comp\_R} = \Delta x_{comp\_R} + x_{lens0} \quad (19)$$

$$y_{comp\_R} = \Delta y_{comp\_R} + y_{lens0} \quad (20)$$

A position $x_{tR}$, $y_{tR}$ of the sub pixel SPixR with taken into account the above-described positional shift due to chromatic aberration can be expressed by Expressions (21) to (24) below by using the coefficients $k_{xpR}$, $k_{xmR}$, $k_{ypR}$, and $k_{ym}$ indicating positions attributable to the configuration of sub pixels.

$$x_{tR} = k_{xpR} + \Delta x_{comp\_R} + x_{lens0} \text{ (for } k_{xmR}=0) \quad (21)$$

$$x_{tR} = -k_{xmR} + \Delta x_{comp\_R} + x_{lens0} \text{ (for } k_{xpR}=0) \quad (22)$$

$$y_{tR} = k_{ypR} + \Delta y_{comp\_R} + y_{lens0} \text{ (for } k_{ymR}=0) \quad (23)$$

$$y_{tR} = -k_{ymR} + \Delta y_{comp\_R} + y_{lens0} \text{ (for } k_{ypR}=0) \quad (24)$$

The values of the position XER, YER of the sub pixel SPixR, which are expressed by Expressions (21) to (24) above cannot be applied in a case of separation from a position $x_c$, $y_c$ of a reference pixel Pix by one or larger. Thus, the values of a position $x_{tB}$, Yes of the sub pixel SPixR each need to be disassembled into an integer part and a part after the decimal point by using Expressions (25) to (28) below. In Expressions (25) and (27) below, "floor" is a function that takes out an integer part by discarding digits after the decimal point.

$$x_{iR} = \text{floor}(x_{tR}) \quad (25)$$

$$k_{xR} = x_{tR} - x_{iR} \quad (26)$$

$$y_{iR} = \text{floor}(y_{tR}) \quad (27)$$

$$k_{yR} = y_{tR} - y_{iR} \quad (28)$$

The position $x_{tB}$, $y_{tB}$ of the sub pixel SPixB with taken into account the above-described positional shift due to chromatic aberration can be expressed by Expressions (29) to (32) below by using the coefficients $k_{xpB}$, $k_{xmb}$, $k_{ypB}$, and $k_{ymB}$ indicating positions attributable to the configuration of sub pixels.

$$x_{tB} = k_{xpB} + \Delta x_{comp\_B} + x_{lens0} \text{ (for } k_{xmB}=0) \quad (29)$$

$$x_{tB} = -k_{xmB} + \Delta x_{comp\_B} + x_{lens0} \text{ (for } k_{xpB}=0) \quad (30)$$

$$y_{tB}=k_{ypB}+\Delta y_{comp\_B}+y_{lens0} \text{ (for } k_{ymB}=0) \quad (31)$$

$$y_{tB}=-k_{ymB}+\Delta y_{comp\_B}+y_{lens0} \text{ (for } k_{ypB}=0) \quad (32)$$

The values of the position $x_{tB}$, $y_{tB}$ of the sub pixel SPixB, which are expressed by Expressions (29) to (32) above cannot be applied in a case of separation from the position $x_c$, $y_c$ of the pixel Pix by one or larger. Thus, the values of the position $x_{tB}$, $y_{tB}$ of the sub pixel SPixB each need to be disassembled into an integer part and a part after the decimal point by using Expressions (33) to (36) below. In Expressions (33) and (35) below, "floor" is a function that takes out an integer part by discarding digits after the decimal point.

$$x_{iB}=\text{floor}(x_{tB}) \quad (33)$$

$$k_{xB}=x_{tB}-x_{iB} \quad (34)$$

$$y_{iB}=\text{floor}(y_{tB}) \quad (35)$$

$$k_{yB}=y_{tB}-y_{iB} \quad (36)$$

The texture coordinate $(u_{sQ}(x, y), v_{sQ}(x, y))$ for each sub pixel SPix, using the coefficients $x_{iQ}$, $k_{xQ}$, $y_{iQ}$, and $k_{yQ}$ (Q=R, G, and B) calculated by using Expressions (11) to (36) above can be expressed by Expressions (37) and (38) below in place of Expressions (7) and (8) above.

$$u_{sQ}(x_G, y_G) = u_c(x_{iQ}, \quad (37)$$

$$y_{iQ}) = \begin{bmatrix} k_{yQ} \\ 1-k_{yQ} \end{bmatrix} \begin{bmatrix} u_c(x_{iQ}+1, y_{iQ}+1) & u_c(x_{iQ}, y_{iQ}+1) \\ u_c(x_{iQ}+1, y_{iQ}) & u_c(x_{iQ}, y_{iQ}) \end{bmatrix} \begin{bmatrix} k_{xQ} \\ 1-k_{xQ} \end{bmatrix}$$

$$v_{sQ}(x_G, y_G) = v_c(x_{iQ}, \quad (38)$$

$$y_{iQ}) = \begin{bmatrix} k_{yQ} \\ 1-k_{yQ} \end{bmatrix} \begin{bmatrix} v_c(x_{iQ}+1, y_{iQ}+1) & v_c(x_{iQ}, y_{iQ}+1) \\ v_c(x_{iQ}+1, y_{iQ}) & v_c(x_{iQ}, y_{iQ}) \end{bmatrix} \begin{bmatrix} k_{xQ} \\ 1-k_{xQ} \end{bmatrix}$$

The texture coordinate difference value $(\Delta u_{sQ}(x, y), \Delta v_{sQ}(x, y))$ expressed in Expressions (39) and (40) below is obtained by subtracting the position $u_c(x_c, y_c)$, $v_c(x_c, y_c)$ of the pixel Pix from the texture coordinate $(u_c(x_{tQ}, y_{tQ}), v_c(x_{tQ}, y_{tQ}))$ for sub pixel SPix, which is expressed in Expressions (37) and (38) above.

$$\Delta u_{sQ}(x,y)=u_c(x_{tQ},y_{tQ})-u_c(x_c,y_c) \quad (39)$$

$$\Delta v_{sQ}(x,y)=v_c(x_{tQ},y_{tQ})-v_c(x_c,y_c) \quad (40)$$

Compensation of a positional shift due to chromatic aberration and processing in accordance with the pixel arrangement of the display panel 110 can be simultaneously performed by holding the texture coordinate $(u_{sQ}(x, y), v_{sQ}(x, y))$, which is generated by using Expressions (5) and (6) above or Expressions (37) and (38) above, as a coordinate transform table in the storage 220 of the image generation device 200 and applying the coordinate transform table to the image deformation processing.

Alternatively, compensation of a positional shift due to chromatic aberration and processing in accordance with the pixel arrangement of the display panel 110 can be simultaneously performed by holding the texture coordinate difference value $(\Delta u_{sQ}(x, y), \Delta v_{sQ}(x, y))$, which is generated by using Expressions (7) and (8) above or Expressions (39) and (40) above, as a coordinate transform table in the storage 220 of the image generation device 200 and applying the coordinate transform table after having obtained the position $u_c(x_c, y_c)$, $v_c(x_c, y_c)$ of the pixel Pix in the image deformation processing.

Figure 15:
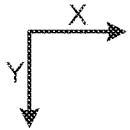
FIG. 15 is a diagram illustrating a first example of a coordinate transform table.

FIG. 15 is a diagram illustrating a first example of the coordinate transform table. In FIG. 15, Q is R, G, and B. Specifically, in a case in which a coordinate transform table tb1Q is used, the storage 220 of the image generation device 200 holds a coordinate transform table tb1R for the sub pixel SPixR, a coordinate transform table tb1G for the sub pixel SPixG, and a coordinate transform table tb1B for the sub pixel SPixB. Since the coordinate transform table tb1Q holds values of the texture coordinate, a sampling point $(u_{tsQ}, v_{tsQ})$ can be obtained only by referring to the transform table in a case of display processing for each display frame.

Alternatively, processing in accordance with the pixel arrangement of the display panel 110 can be simultaneously performed by holding the texture coordinate difference value $(\Delta u_{sQ}(x, y), \Delta v_{sQ}(x, y))$, which is generated by using Expressions (7) and (8) above or Expression (7) above to which Expression (37) above is applied and Expression (8) above to which Expression (38) above is applied, as a coordinate transform table in the storage 220 of the image generation device 200 and applying the coordinate transform table to the image deformation processing.

Figure 16:
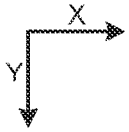
FIG. 16 is a diagram illustrating a second example of the coordinate transform table.

FIG. 16 is a diagram illustrating a second example of the coordinate transform table. In FIG. 16, Q is R, G, and B. Specifically, in a case in which a coordinate transform table tb2Q is used, the storage 220 of the image generation device 200 holds a coordinate transform table tb2R for the sub pixel SPixR, a coordinate transform table tb2G for the sub pixel SPixG, and a coordinate transform table tb2B for the sub pixel SPixB. Since the coordinate transform table tb2Q holds difference values of the texture coordinate, the texture coordinate $(u_c, v_c)$ as a reference for each pixel Pix needs to be acquired and added to a value in the transform table to obtain the sampling point $(u_{tsQ}, v_{tsQ})$ in a case of display processing for each display frame. It is possible to deal with a case in which the state of the reference texture (texture coordinate $(u_c, v_c)$) changes with each drawing processing as well.

Figure 17:
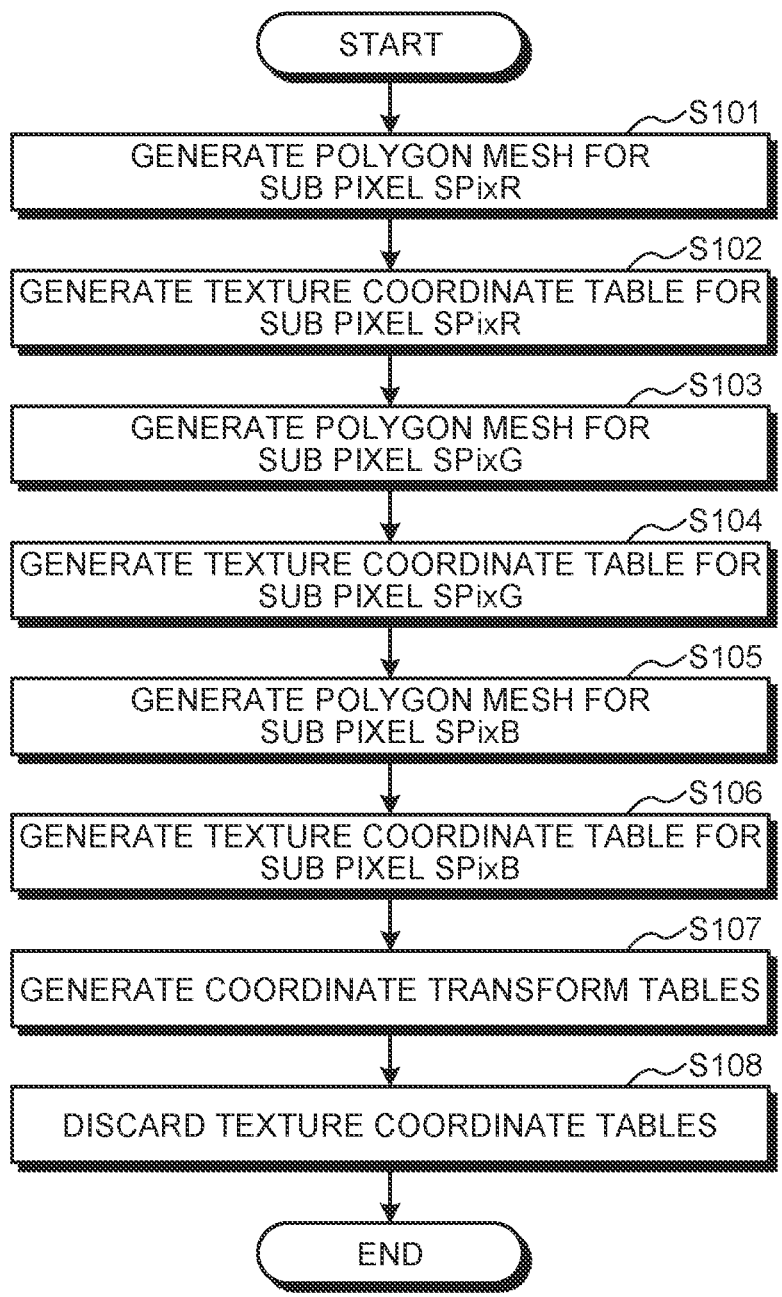
FIG. 17 is a flowchart illustrating a first example of processing of deriving the coordinate transform table according to the embodiment.
Figure 18:
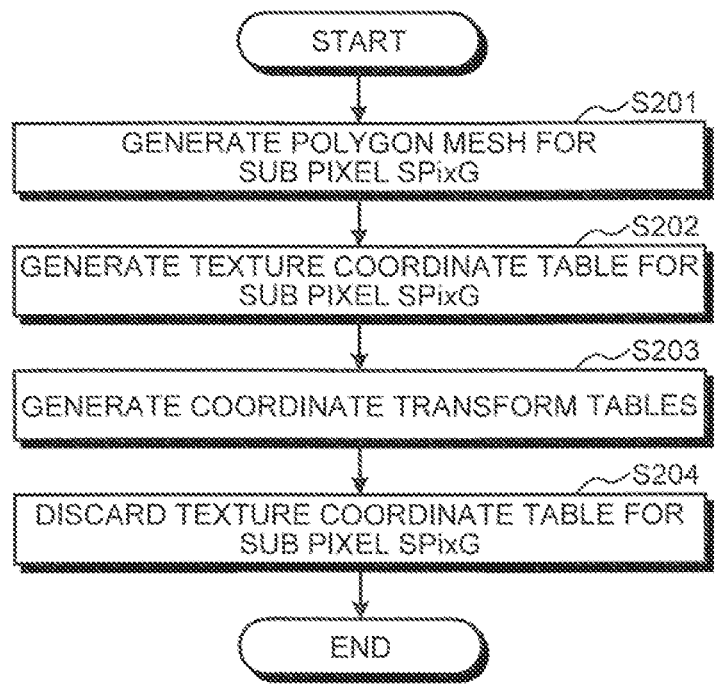
FIG. 18 is a flowchart illustrating a second example of processing of deriving the coordinate transform table according to the embodiment.

The following describes processing of deriving the coordinate transform table tb2Q using a polygon mesh with reference to FIGS. 17 and 18. FIG. 17 is a flowchart illustrating a first example of processing of deriving the coordinate transform table according to the embodiment. FIG. 18 is a flowchart illustrating a second example of processing of deriving the coordinate transform table according to the embodiment.

In the example illustrated in FIG. 17, the first method of correcting the chromatic aberration due to the lens 410 is applied to the processing of deriving the coordinate transform table tb2Q.

In the first example illustrated in FIG. 17 in which the first method is applied, polygon meshes corresponding to the sub pixels SPixR, SPixG, and SPixB in accordance with the chromatic aberration due to the lens 410 are used. First, the control circuit 230 of the image generation device 200 generates a polygon mesh corresponding to the sub pixel SPixR (step S101).

Subsequently, the control circuit 230 generates a polygon mesh corresponding to the sub pixel SPixR. The polygon mesh is produced in a predetermined shape that compensates the R-color lens magnification ratio and distortion of the lens 410, the texture coordinate $(u_{cR}(x, Y), v_{cR}(x, y))$ corresponding to the sub pixel SPixR is obtained by texture mapping, and a texture coordinate table corresponding to the sub pixel SPixR is generated (step S102).

Subsequently, the control circuit 230 generates a polygon mesh corresponding to the sub pixel SPixG (step S103).

Subsequently, the control circuit 230 generates a polygon mesh corresponding to the sub pixel SPixG. The polygon mesh is produced in a predetermined shape that compensates the G-color lens magnification ratio and distortion of the lens 410, the texture coordinate ($u_{cG}(x, y)$, $v_{cG}(x, y)$) corresponding to the sub pixel SPixG is obtained by texture mapping, and a texture coordinate table corresponding to the sub pixel SPixG is generated (step S104).

Subsequently, the control circuit 230 generates a polygon mesh corresponding to the sub pixel SPixB (step S105).

Subsequently, the control circuit 230 generates a polygon mesh corresponding to the sub pixel SPixB. The polygon mesh is produced in a predetermined shape that compensates the B-color lens magnification ratio and distortion of the lens 410, the texture coordinate ($u_{cB}(x, y)$, $v_{cB}(x, y)$) corresponding to the sub pixel SPixB is obtained by texture mapping, and a texture coordinate table corresponding to the sub pixel SPixB is generated (step S106).

Then, the control circuit 230 calculates the texture coordinate ($u_{sR}(x, y)$, $v_{sR}(x, y)$), the texture coordinate ($u_{sG}(x, y)$, $v_{sG}(x, y)$), and the texture coordinate ($u_{sB}(x, y)$, $v_{sB}(x, y)$) for the respective sub pixels SPixR, SPixG, and SPixB by using Expressions (5) and (6) above. The control circuit 230 takes one of the sub pixels SPixR, SPixG, and SPixB as a representative (for example, the position $u_{cG}(x, y)$, $v_{cG}(x, y)$ of the sub pixel SPixG as representative values), obtains the texture coordinate difference value ($\Delta u_{sQ}(x, y)$, $\Delta v_{sQ}(x, y)$) for each of the sub pixels SPixR, SPixG, and SPixB by using Expressions (7) and (8) above, generates the coordinate transform table tb2Q for each of the sub pixels SPixR, SPixG, and SPixB (step S107), and discards the texture coordinate tables generated for the sub pixels SPixR, SPixG, and SPixB at steps S102, S104, and S106 (step S108).

In the example illustrated in FIG. 18, the second method of correcting the chromatic aberration due to the lens 410 is applied to the processing of deriving the coordinate transform table tb2Q.

In the second example illustrated in FIG. 18 in which the second method is applied, a polygon mesh with the sub pixel SPixG as a representative is used.

First, the control circuit 230 of the image generation device 200 generates a polygon mesh corresponding to the sub pixel SPixG (step S201). The polygon mesh is produced in a predetermined shape that compensates the G-color lens magnification ratio and distortion of the lens 410.

Subsequently, the control circuit 230 obtains the texture coordinate ($u_{cG}(x, y)$, $v_{cG}(x, y)$) corresponding to the sub pixel SPixG by texture mapping and generates a texture coordinate table corresponding to the sub pixel SPixG (step S202).

Then, the control circuit 230 calculates the coefficients $x_{iQ}$, $k_{xQ}$, $y_{iQ}$, and $k_{yQ}$ (Q=R, G, and B) by using Expressions (11) to (36) above and calculates the texture coordinate ($u_{gR}(x, y)$, $v_{sR}(x, y)$), the texture coordinate ($u_{sG}(x, y)$, $v_{sG}(x, y)$), and the texture coordinate ($u_{sB}(x, y)$, $v_{sB}(x, y)$) for the respective sub pixels SPixR, SPixG, and SPixB by using Expressions (37) and (38) above. The control circuit 230 obtains the texture coordinate difference value ($\Delta u_{sQ}(x, y)$, $\Delta v_{sQ}(x, y)$) for each of the sub pixels SPixR, SPixG, and SPixB by using Expressions (39) and (40) above, generates the coordinate transform table tb2Q for each of the sub pixels SPixR, SPixG, and SPixB (step S203), and discards the texture coordinate table generated for the sub pixel SPixG at step S202 (step S204).

The above-described coordinate transform table tb1Q (Q=R, G, and B) for each sub pixel SPix or the above-described coordinate transform table tb2Q (Q=R, G, and B) for each sub pixel SPix may be stored in accordance with the lens 410 of the HMD in the storage 220 of the image generation device 200 in advance or may be held in accordance with the lens 410 of the HMD in the storage 220 as the control circuit 230 of the image generation device 200 executes the processing of deriving the coordinate transform table tb1Q or the coordinate transform table tb2Q when the display system 1 is activated. Alternatively, the coordinate transform table may be held in the storage 220 in accordance with the executed VR application 212 as the control circuit 230 of the image generation device 200 executes the processing of deriving the coordinate transform table tb1Q or the coordinate transform table tb2Q as appropriate.

The following describes a method of deriving a pixel value applied to each sub pixel SPix of the display panel 110 in display operation for each display frame by using the texture coordinate difference value ($\Delta u_{sQ}(x, y)$, $\Delta v_{sQ}(x, y)$) or the texture coordinate ($u_{sQ}(x, y)$, $v_{sQ}(x, y)$).

As described above, in the HMD, an image displayed on each display panel 110 is enlarged through the lens 410 and observed, and thus image deformation processing for compensating the lens distortion is performed on the image displayed on the display panel 110. In the image deformation processing, display data at the position x, y of a pixel Pix is sampled from the texture coordinate ($u_{sQ}(x, y)$, $v_{sQ}(x, y)$) of the original image, and color data not only at one point that matches the texture coordinate ($u_{sQ}(x, y)$, $v_{sQ}(x, y)$) but also at one or more data definition points are sampled to calculate the pixel value of each of the sub pixels SPixR, SPixG, and SPixB. In this case, the pixel value of each of the sub pixels SPixR, SPixG, and SPixB needs to be generated in accordance with disposition of the data definition points after moved by the image deformation processing.

When sampling is performed for each sub pixel SPix, the problem of coloring (false color) occurs due to aliasing noise. In the image deformation processing based on texture mapping, the spacing of texture to be sampled does not necessarily match the spacing of sampling (in other words, the pixel spacing of the display panel 110), which is countered by multisampling and blurring processing. In the present disclosure, since sampling is performed for sub pixel SPix, state differences between sub pixels SPix are easily noticeable as false colors.

Figure 19:
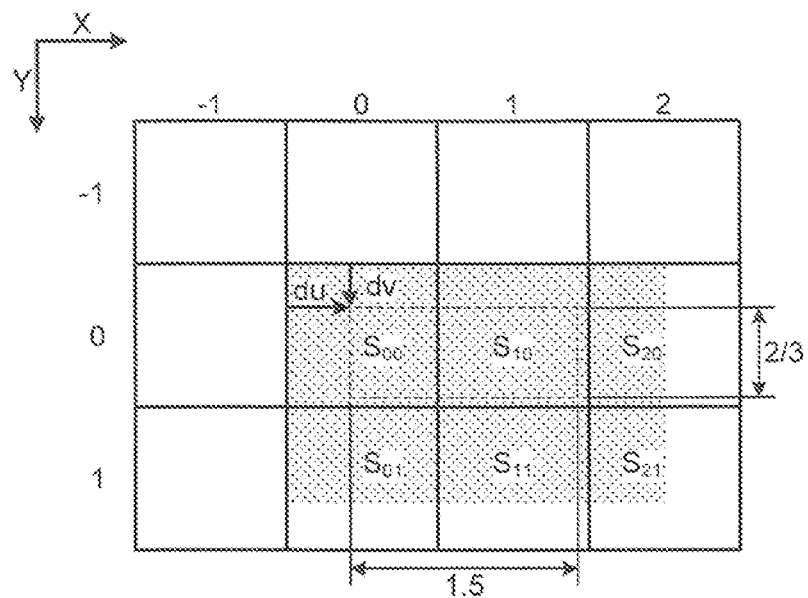
FIG. 19 is a diagram illustrating a first example of the relative positions of texels and a plane-filling figure on texture corresponding to a plane-filling figure in the size of one pixel on the display panel when sampling is performed by using an area averaging method.

The present disclosure describes examples in which an area averaging method and a multipoint averaging method are used as methods of sampling for each sub pixel SPix. FIG. 19 is a diagram illustrating a first example of the relative positions of texels and a plane-filling figure on texture corresponding to a plane-filling figure in the size of one pixel on the display panel when sampling is performed by using the area averaging method. In FIG. 19, grids with solid lines indicate the boundary lines of texels, and dashed lines indicate the plane-filling figure. In the example illustrated in FIG. 19, the width of the plane-filling figure in the X direction is 1.5 times larger than the width of each texel and the width of the plane-filling figure in the Y direction is equal to ⅔ of the width of each texel. The plane-filling figure overlaps texels in various manners and potentially overlaps 3×2 texels since dx and dy take values of 0 to 1. The areas of regions in which the plane-filling figure overlaps the respective texels are represented by $S_{00}$, $S_{10}$, $S_{20}$, $S_{01}$, $S_{11}$, and $S_{21}$.

In the example illustrated in FIG. 19, a pixel value $F_Q$ of a linear space indicated by the plane-filling figure can be expressed by Expression (41) below.

$$F_Q = \sum_{i=0}^{2}\sum_{j=0}^{1} Q_{ij}^{2.2} S_{i,j} \qquad (41)$$

Figure 20:
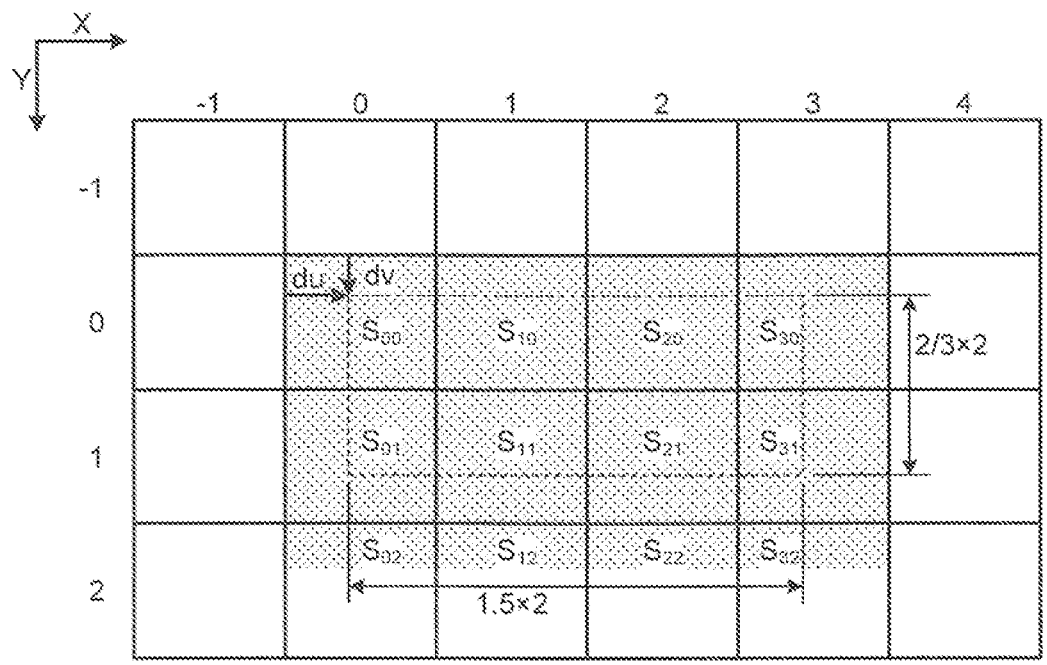
FIG. 20 is a diagram illustrating a second example of the relative positions of each texel and the plane-filling figure when sampling is performed by using the area averaging method.

FIG. 20 is a diagram illustrating a second example of the relative positions of texels and a plane-filling figure when sampling is performed by using the area averaging method. In the example illustrated in FIG. 20, the width of the plane-filling figure in the X direction is 1.5×2 times larger than the width of each texel and the width of the plane-filling figure in the Y direction is ⅔×2 times larger than the width of each texel. The areas of regions in which the plane-filling figure overlaps the respective texels that the plane-filling figure potentially overlaps a sampling point in the width of the relative position du, dv (0 to 1 in texel units) of the corresponding texel are represented by $S_{00}$, $S_{10}$, $S_{20}$, $S_{30}$, $S_{01}$, $S_{11}$, $S_{21}$, $S_{31}$, $S_{02}$, $S_{12}$, $S_{22}$, and $S_{32}$.

In the example illustrated in FIG. 20, the pixel value $F_Q$ of a linear space indicated by the plane-filling figure can be expressed by Expression (42) below.

$$F_Q = \frac{1}{4}\sum_{i=0}^{3}\sum_{j=0}^{2} Q_{i,j}^{2.2} S_{i,j} \qquad (42)$$

A pixel value $f_Q$ transmitted to the display panel 110 can be expressed by Expression (43) below that applies gamma correction to the pixel value $F_Q$ expressed by Expression (41) above or Expression (42) above.

$$f_Q = F_Q^{\frac{1}{2.2}} \qquad (43)$$

Figure 21:
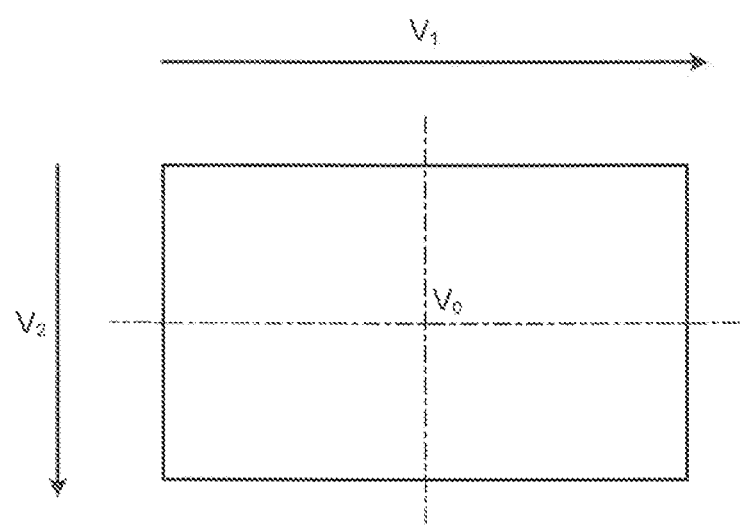
FIG. 21 is a diagram illustrating vectors representing the size of the plane-filling figure in an XY coordinate system and the central position thereof when sampling is performed by using a multipoint averaging method.
Figure 22:
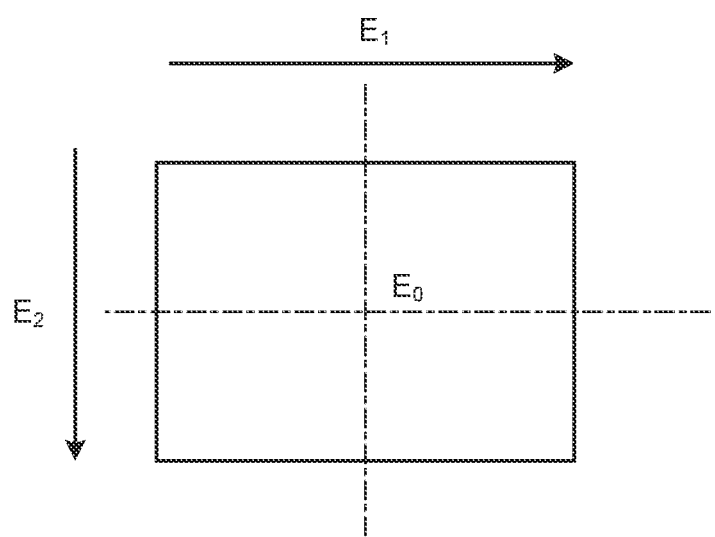
FIG. 22 is a diagram illustrating a figure in a uv coordinate system, corresponding to the plane-filling figure in the XY coordinate system illustrated in FIG. 21.
Figure 23A:
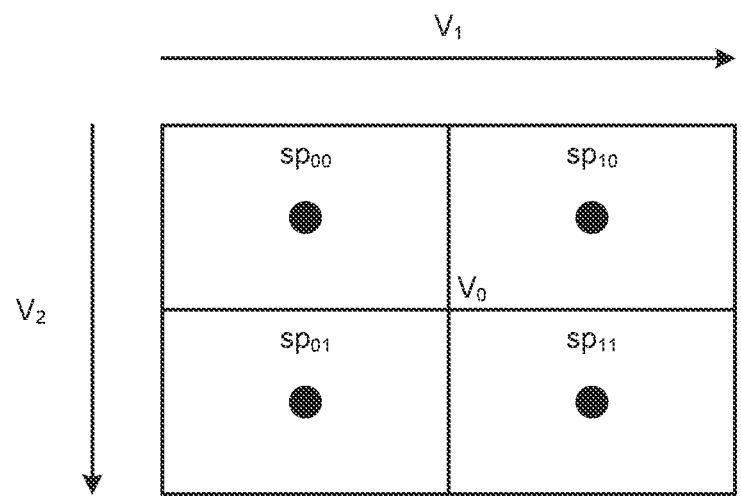
FIG. 23A is a diagram illustrating an example in which the plane-filling figure is divided into four when sampling is performed by using the multipoint averaging method.
Figure 23B:
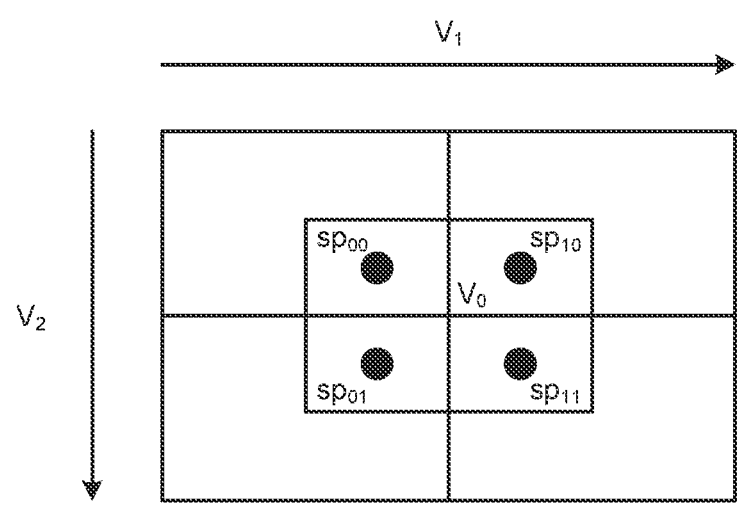
FIG. 23B is a diagram illustrating an example in which the plane-filling figure is divided into four when sampling is performed by using the multipoint averaging method.
Figure 23C:
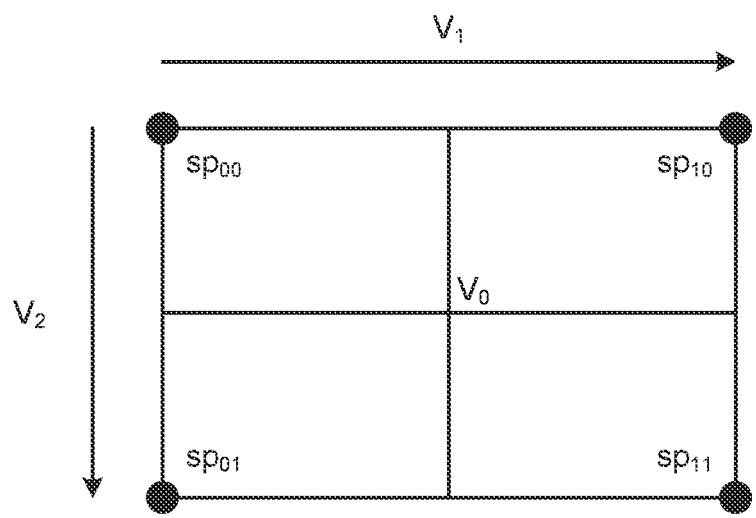
FIG. 23C is a diagram illustrating an example in which the plane-filling figure is divided into four when sampling is performed by using the multipoint averaging method.
Figure 23D:
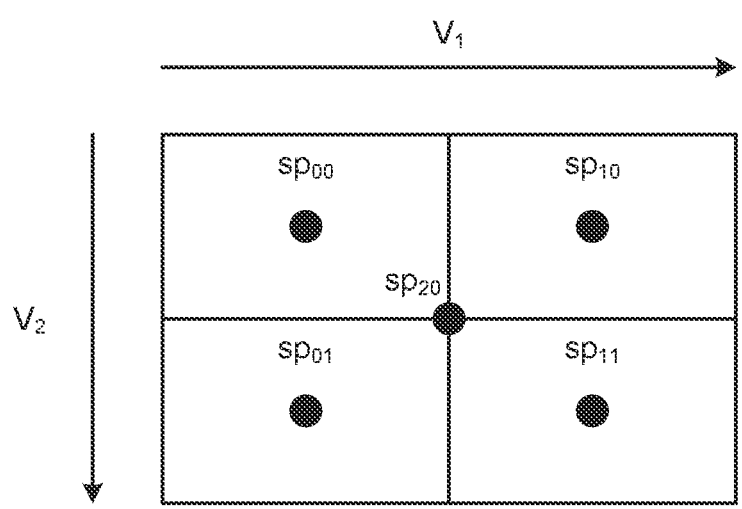
FIG. 23D is a diagram illustrating an example in which the plane-filling figure is divided into four when sampling is performed by using the multipoint averaging method.

FIG. 21 is a diagram illustrating vectors representing the size and orientation of a plane-filling figure in the XY coordinate system and the central position thereof when sampling is performed by using the multipoint averaging method. In FIG. 21, $V_0$ represents the central position of a pixel. Vectors $V_1$ and $V_2$ represent the size and orientation of the plane-filling figure in the XY coordinate system. FIG. 22 is a diagram illustrating a figure in the uv coordinate system, corresponding to the plane-filling figure in the XY coordinate system illustrated in FIG. 21. In FIG. 22, E, corresponds to the central position $V_0$ of the pixel Pix illustrated in FIG. 21. A vector $E_1$ corresponds to the vector $V_1$ illustrated in FIG. 21. A vector $E_2$ corresponds to the vector $V_2$ illustrated in FIG. 21. The value $E_0 = (u_{sQ}, V_{sQ})$ at the center in the uv coordinate system corresponds to the position $V_0$ of a sub pixel SPix to be sampled in the XY coordinate system.

The multipoint averaging method, which samples and averages from a plurality of positions based on the texture coordinate $(u_{sQ}, v_{sQ})$, can easily accommodate texture deformation and rotation. Since the above-described coordinate transform table includes a plurality of texture coordinates in accordance with the position of the sub pixel SPix in the XY coordinate system, the size of the plane-filling figure on a texel can be obtained from values in the coordinate transform table referred at sampling.

When the values of the texture coordinate $(u_{sQ}, v_{sQ})$ or the texture coordinate difference value $(\Delta u_{sQ}, \Delta v_{sQ})$ acquired from a plurality of coordinate transform tables corresponding to a plurality of sub pixels SPix include two or more difference values that are not parallel, the vectors $E_1$ and $E_2$ representing the size and orientation of the plane-filling figure in the uv coordinate system can be calculated by treating the plurality of difference values as linearly independent vectors. When the coordinate transform tables do not include two or more difference values that are not parallel, the vectors $E_1$ and $E_2$ in the uv coordinate system corresponding to the vectors $V_1$ and $V_2$ in a predetermined XY coordinate system may be calculated and a table holding the values of the vectors $E_1$ and $E_2$ may be produced in advance and referred.

FIGS. 23A, 23B, 23C, and 23D are each a diagram illustrating an example in which a plane-filling figure is divided into four when sampling is performed by using the multipoint averaging method. When the plane-filling figure is divided into four as illustrated in FIGS. 23A, 23B, 23C, and 23D, the pixel value $F_Q$ in a sampled linear space can be expressed by Expressions (44) and (45) below. In Expressions (44) and (45) below, $sp_{ij}$ represents a sampling point. In Expression (44) below, Sa is a function that obtains a pixel value from $sp_{ij}$ in the uv coordinate system.

$$F_Q = \frac{1}{4}\sum_{i=0}^{1}\sum_{j=0}^{1} Sa^{2.2}(sp_{i,j}) \qquad (44)$$

$$sp_{i,j} = E_0 + a\left(\frac{i-0.5}{2}E_1 + \frac{j-0.5}{2}E_2\right) \qquad (45)$$

$$i = 0,1 \quad j = 0,1$$

When a is set to 1 in Expression (44) above, the position of each sampling point $sp_{ij}$ becomes positions illustrated in FIG. 20A. When a is set to 0.5 in Expression (44) above, the position of each sampling point $sp_{ij}$ becomes positions illustrated in FIG. 23B. When a is set to 2 in Expression (44) above, the position of each sampling point $sp_{ij}$ becomes positions illustrated in FIG. 23C.

When the value of a in Expression (44) above is set to 1 or less, an aliasing noise reducing effect (hereinafter also referred to as an "anti-aliasing effect") decreases and the resolution can be increased. When the value of a in Expression (44) above is increased, the anti-aliasing effect can be increased.

The central position $V_0$ of the plane-filling figure in the XY coordinate system, which is expressed by Expression (46) below, may be added as the sampling point.

$$Sp_{20} = V_0 \qquad (46)$$

Figure 24:
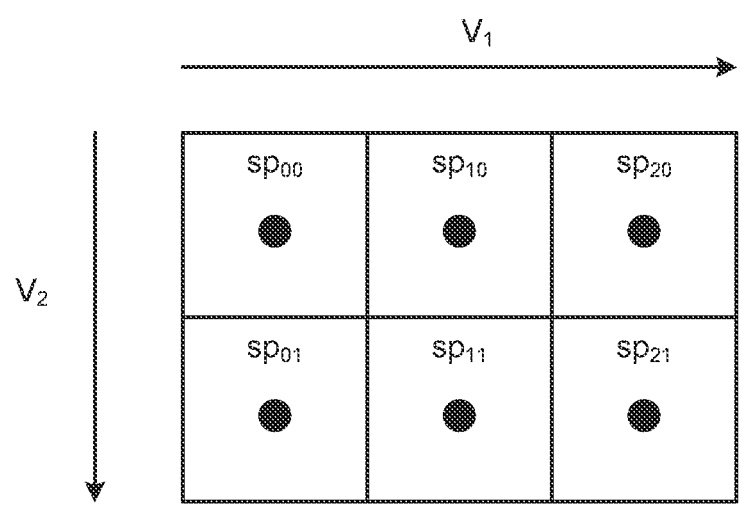
FIG. 24 is a diagram illustrating an example in which the plane-filling figure is divided into six when sampling is performed by using the multipoint averaging method.

FIG. 24 is a diagram illustrating an example in which a plane-filling figure is divided into six when sampling is performed by using the multipoint averaging method. When the plane-filling figure is divided into six as illustrated in FIG. 24, the sampling point $sp_{ij}$ can be expressed by Expression (47) below.

$$sp_{i,j} = E_0 + a\left(\frac{j-1}{3}E_1 + \frac{i-0.5}{2}E_1\right) \qquad (47)$$

$$i = 0,1,2 \quad j = 0,1$$

The pixel value $f_Q$ transmitted to the display panel 110 can be expressed by Expression (48) below that applies gamma correction to the pixel value $F_Q$ expressed by Expression (44) above. However, when an input value to the display panel 110 is linear data, this processing is unnecessary and $F_Q$ may be directly output.

$$f_Q = F_Q^{\frac{1}{2.2}} \qquad (48)$$

Figure 25:
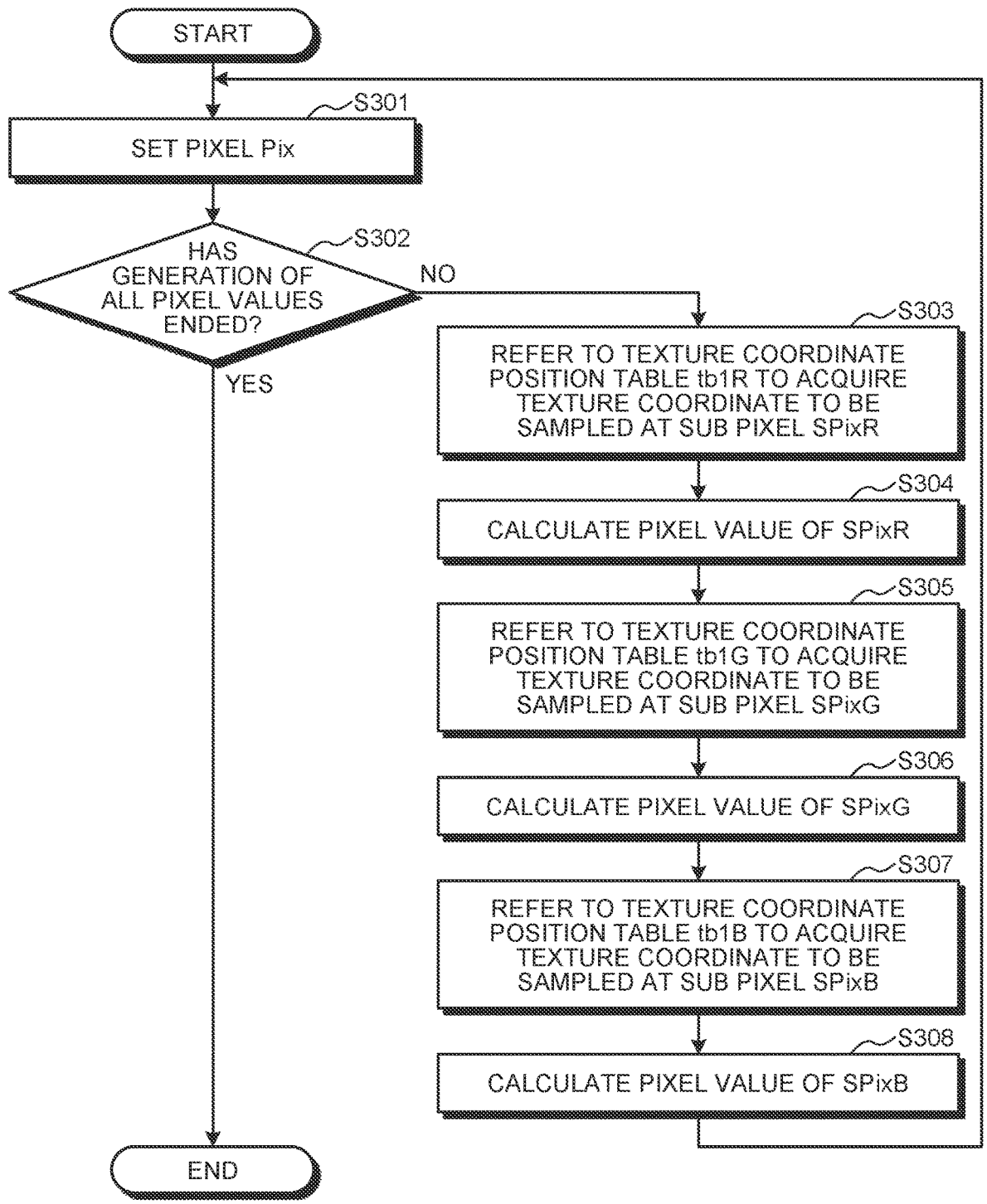
FIG. 25 is a flowchart illustrating a first example of the image deformation processing according to the embodiment.
Figure 26:
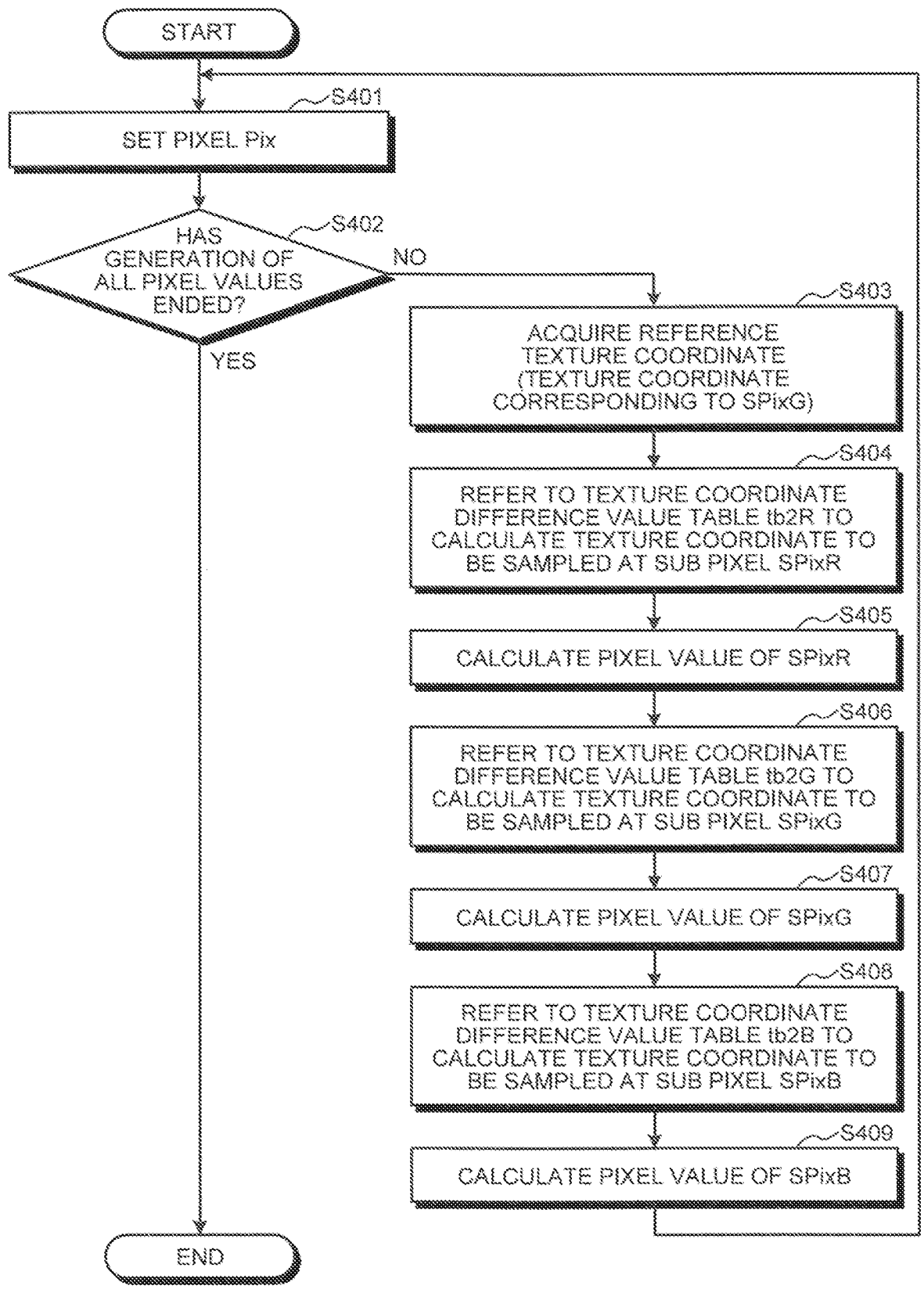
FIG. 26 is a flowchart illustrating a second example of the image deformation processing according to the embodiment.

The following describes specific examples of the image deformation processing executed for each display frame with reference to FIGS. 25 and 26.

FIG. 25 is a flowchart illustrating a first example of the image deformation processing according to the embodiment. FIG. 26 is a flowchart illustrating a second example of the image deformation processing according to the embodiment. The first example illustrated in FIG. 25 is an example of the image deformation processing using the coordinate transform table tb1Q illustrated in FIG. 15. The second example illustrated in FIG. 26 is an example of the image deformation processing using the coordinate transform table tb2Q illustrated in FIG. 16.

The first example illustrated in FIG. 25 assumes that the coordinate transform table tb1Q (Q=R, G, and B) for each sub pixel SPix is held in the storage 220 of the image generation device 200. In the image deformation processing using the coordinate transform table, which is illustrated in FIG. 25, the control circuit 230 of the image generation device 200 sets a pixel Pix on the display panel 110 for which a pixel value is to be generated (step S301) and determines whether the pixel value generation has ended for all pixels of one frame (step S302).

If the pixel value generation has not ended for all pixels of one frame (No at step S302), the control circuit 230 refers to the coordinate transform table tb1R to acquire a texture coordinate to be sampled at the sub pixel SPixR of the pixel Pix set at step S301 (step S303) and calculates the pixel value of the sub pixel SPixR by using the above-described sampling method (step S304).

Subsequently, the control circuit 230 refers to the coordinate transform table tb1G to acquire a texture coordinate to be sampled at the sub pixel SPixG of the pixel Pix set at step S301 (step S305) and calculates the pixel value of the sub pixel SPixG by using the above-described sampling method (step S306).

Subsequently, the control circuit 230 refers to the coordinate transform table tb1B to acquire a texture coordinate to be sampled at the sub pixel SPixB of the pixel Pix set at step S301 (step S307) and calculates the pixel value of the sub pixel SPixB by using the above-described sampling method (step S308).

Subsequently, the control circuit 230 returns to step S301 and repeats the processing up to step S308. If the pixel value generation has ended for all pixels of one frame at step S302 (Yes at step S302), the image deformation processing for one frame ends.

The second example illustrated in FIG. 26 assumes that the coordinate transform table tb2Q (Q=R, G, and B) for each sub pixel SPix is held in the storage 220 of the image generation device 200. In the image deformation processing using the coordinate transform table, which is illustrated in FIG. 26, the control circuit 230 of the image generation device 200 first sets a pixel Pix on the display panel 110 for which a pixel value is to be generated (step S401) and determines whether the pixel value generation has ended for all pixels of one frame (step S402).

If the pixel value generation has not ended for all pixels of one frame (No at step S402), the control circuit 230 acquires a texture coordinate (for example, the texture coordinate ($u_{cG}(x, y)$, $v_{cG}(x, y)$) corresponding to the sub pixel SPixG) as a reference for the coordinate transform table tb2Q (Q=R, G, and B) of the pixel Pix set at step S401 by using a reference polygon mesh (for example, a polygon mesh corresponding to the sub pixel SPixG) (step S403).

The control circuit 230 refers to the coordinate transform table tb2R to acquire a texture coordinate corresponding to the sub pixel SPixR, which is to be sampled at the sub pixel SPixR of the pixel Pix set at step S401 (step S404). Specifically, the control circuit 230 calculates the texture coordinate ($u_{sR}(x, y)$, $v_{sR}(x, y)$) by using Expressions (49) and (50) below, which are transformed from Expressions (7) to (10) above.

$$u_{sR}(x,y) = u_{cG}(x,y) + \Delta u_{sR}(x,y) \qquad (49)$$

$$v_{sR}(x,y) = v_{cG}(x,y) + \Delta u_{sR}(x,y) \qquad (50)$$

Then, the control circuit 230 calculates the pixel value of the sub pixel SPixR by using the above-described sampling method (step S405).

Subsequently, the control circuit 230 refers to the coordinate transform table tb2G to acquire a texture coordinate corresponding to the sub pixel SPixG, which is to be sampled at the sub pixel SPixG of the pixel Pix set at step S401 (step S406). Specifically, the control circuit 230 calculates the texture coordinate ($u_{sG}(x, y)$, $v_{sG}(x, y)$) by using Expressions (51) and (52) below, which are transformed from Expressions (7) to (10) above.

$$u_{sG}(x,y) = u_{cG}(x,y) + \Delta u_{sG}(x,y) \qquad (51)$$

$$v_{sG}(x,y) = v_{cG}(x,y) + \Delta u_{sG}(x,y) \qquad (52)$$

Then, the control circuit 230 calculates the pixel value of the sub pixel SPixG by using the above-described sampling method (step S407).

Subsequently, the control circuit 230 refers to the coordinate transform table tb2B to acquire a texture coordinate corresponding to the sub pixel SPixB, which is to be sampled at the sub pixel SPixB of the pixel Pix set at step S401 (step S408). Specifically, the control circuit 230 calculates the texture coordinate ($u_{sB}(x, y)$, $v_{sB}(x, y)$) by using Expressions (53) and (54) below, which are transformed from Expressions (7) to (10) above.

$$u_{sB}(x,y) = u_{cG}(x,y) + \Delta u_{sB}(x,y) \qquad (53)$$

$$v_{sB}(x,y) = v_{cG}(x,y) + \Delta u_{sB}(x,y) \qquad (54)$$

Then, the control circuit 230 calculates the pixel value of the sub pixel SPixB by using the above-described sampling method (step S409).

Subsequently, the control circuit 230 returns to step S401 and repeats the processing up to step S409. If the pixel value generation has ended for all pixels of one frame at step S402 (Yes at step S402), the image deformation processing for one frame ends.

The following describes specific examples of the pixel arrangement of each display panel 110.

Figure 27:
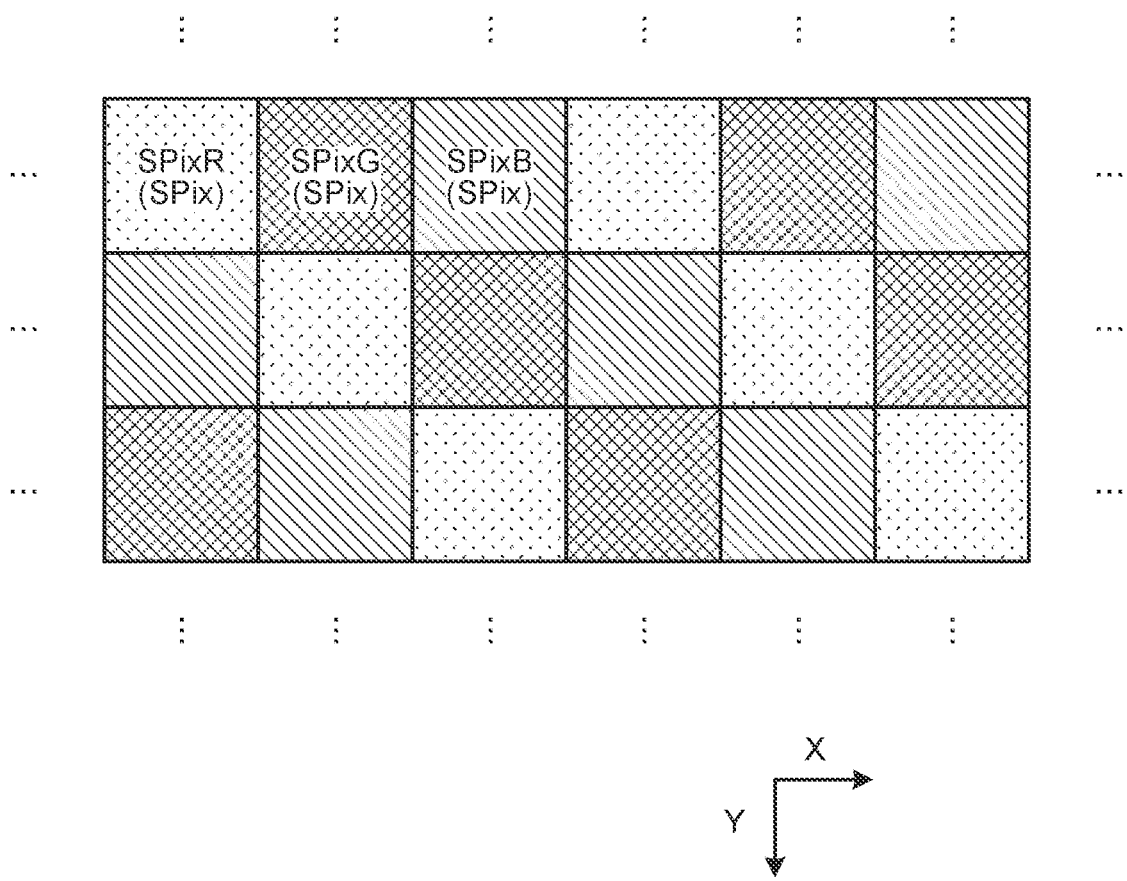
FIG. 27 is a diagram illustrating a first example of a pixel arrangement of the display panel according to the embodiment.

FIG. 27 is a diagram illustrating a first example of the pixel arrangement of the display panel according to the embodiment. The first example of the pixel arrangement of the display panel 110 according to the embodiment illustrated in FIG. 27 has a pixel arrangement, what is called a mosaic arrangement, in which the sub pixels SPixR, SPixG, and SPixB are shifted by one in the X direction for each line. In other words, in the first example of the pixel arrangement of the display panel 110 according to the embodiment, each pixel Pix includes the sub pixel SPixR (first pixel) for displaying red (first color; R), the sub pixel SPixG (second pixel) for displaying green (second color; G), and the sub pixel SPixB (third pixel) for displaying blue (third color; B). The sub pixel SPixR (first pixel) is sandwiched between the sub pixel SPixG (second pixel) and the sub pixel SPixB (third pixel) in the X direction, and the sub pixel SPixR (first pixel) is sandwiched between the sub pixel SPixG (second pixel) and the sub pixel SPixB (third pixel) in the Y direction. The sub pixel SPixG (second pixel) is sandwiched between the sub pixel SPixR (first pixel) and the sub pixel SPixB (third pixel) in the X direction, and the sub pixel SPixG (second pixel) is sandwiched between the sub pixel SPixR (first pixel) and the sub pixel SPixB (third pixel) in the Y direction. The sub pixel SPixB (third pixel) is sandwiched between the sub pixel SPixG (second pixel) and the sub pixel SPixR (first pixel) in the X direction, and the sub pixel SPixB (third pixel) is sandwiched between the sub pixel SPixG (second pixel) and the sub pixel SPixR (first pixel) in the Y direction. In the example illustrated in FIG. 27, the sub pixels SPixR, SPixG, and SPixB are rectangular. Although FIG. 27 illustrates the example in which the sub pixels SPixR, SPixG, and SPixB are rectangular, the shapes of the sub pixels SPixR, SPixG, and SPixB are not limited thereto.

Figure 28:
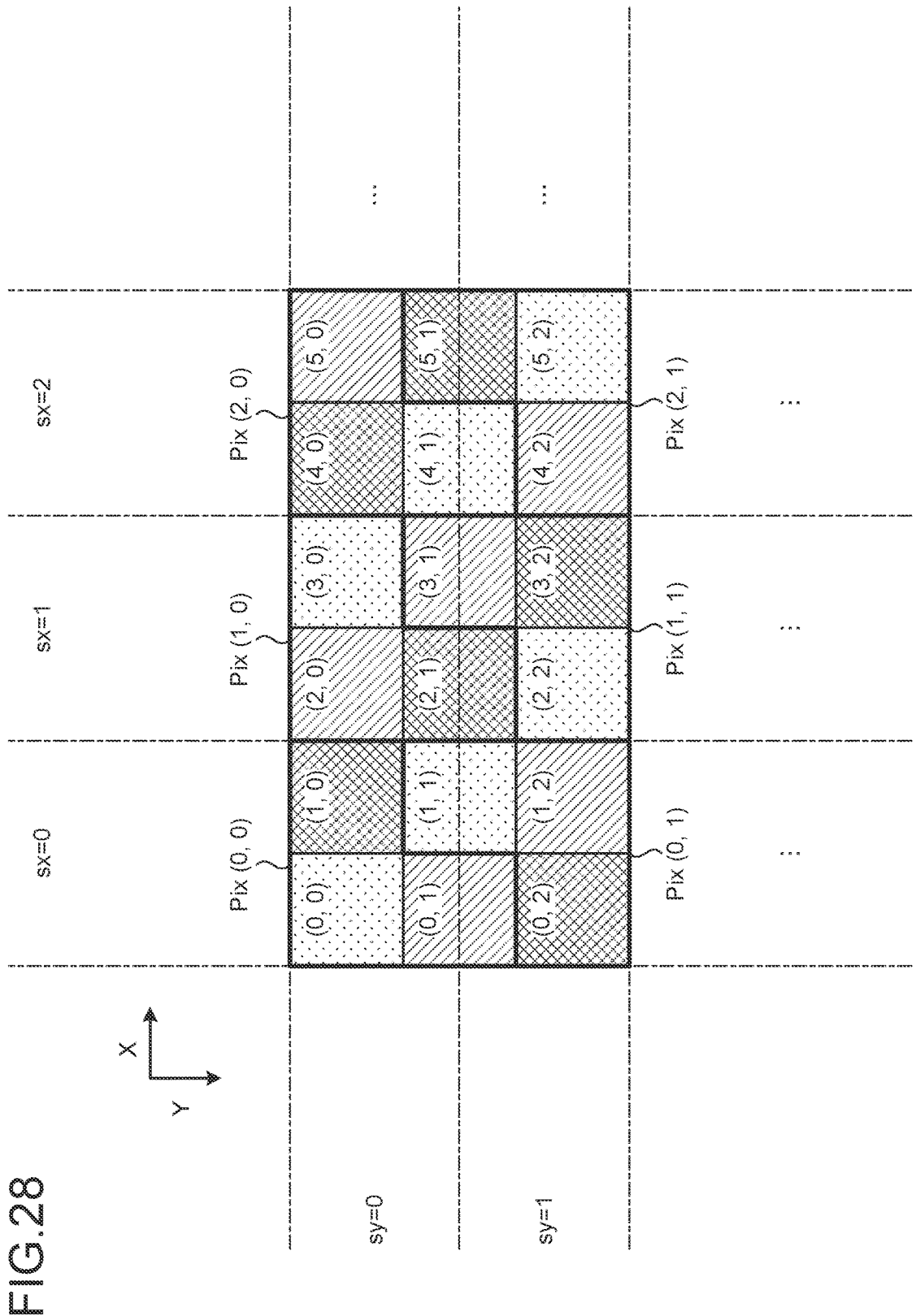
FIG. 28 is a diagram illustrating a first example of the pixel configuration of the pixel arrangement illustrated in FIG. 27.

FIG. 28 is a diagram illustrating a first example of the pixel configuration of the pixel arrangement illustrated in FIG. 27. In the example illustrated in FIG. 28, a pixel Pix (0, 0) includes a sub pixel SPixR (0, 0), a sub pixel SPixG (1, 0), and a sub pixel SPixB (0, 1). A pixel Pix (1, 0) includes a sub pixel SPixR (3, 0), a sub pixel SPixG (2, 1), and a sub pixel SPixB (2, 0). A pixel Pix (2, 0) includes a sub pixel SPixR (4, 1), a sub pixel SPixG (4, 0), and a sub pixel SPixB (5, 0).

A pixel Pix (0, 1) includes a sub pixel SPixR (1, 1), a sub pixel SPixG (0, 2), and a sub pixel SPixB (1, 2). A pixel Pix (1, 1) includes a sub pixel SPixR (2, 2), a sub pixel SPixG (3, 2), and a sub pixel SPixB (3, 1). A pixel Pix (2, 1) includes a sub pixel SPixR (5, 2), a sub pixel SPixG (5, 1), and a sub pixel SPixB (4, 2).

In the pixel configuration illustrated in FIG. 28, the configuration of a total of six pixels of three pixels in the X direction and two pixels in the Y direction repeatedly appears in the X and Y directions. The six pixels of 3×2 pixels are treated as one pixel block.

The following describes an example in which the display panel 110 according to the embodiment in the pixel configuration illustrated in FIG. 28 transmits pixel data including the pixel values of the sub pixels SPixR, SPixG, and SPixB for each pixel Pix (sx, sy) to the control circuit 230 of the image generation device 200. The coordinates sx and sy can be expressed by Expressions (55) and (56) below, respectively. In Expressions (55) and (56) below, % represents calculation that obtains the remainder of division.

$$sx=x\%3 \qquad (55)$$

$$sy=y\%2 \qquad (56)$$

Figure 29:
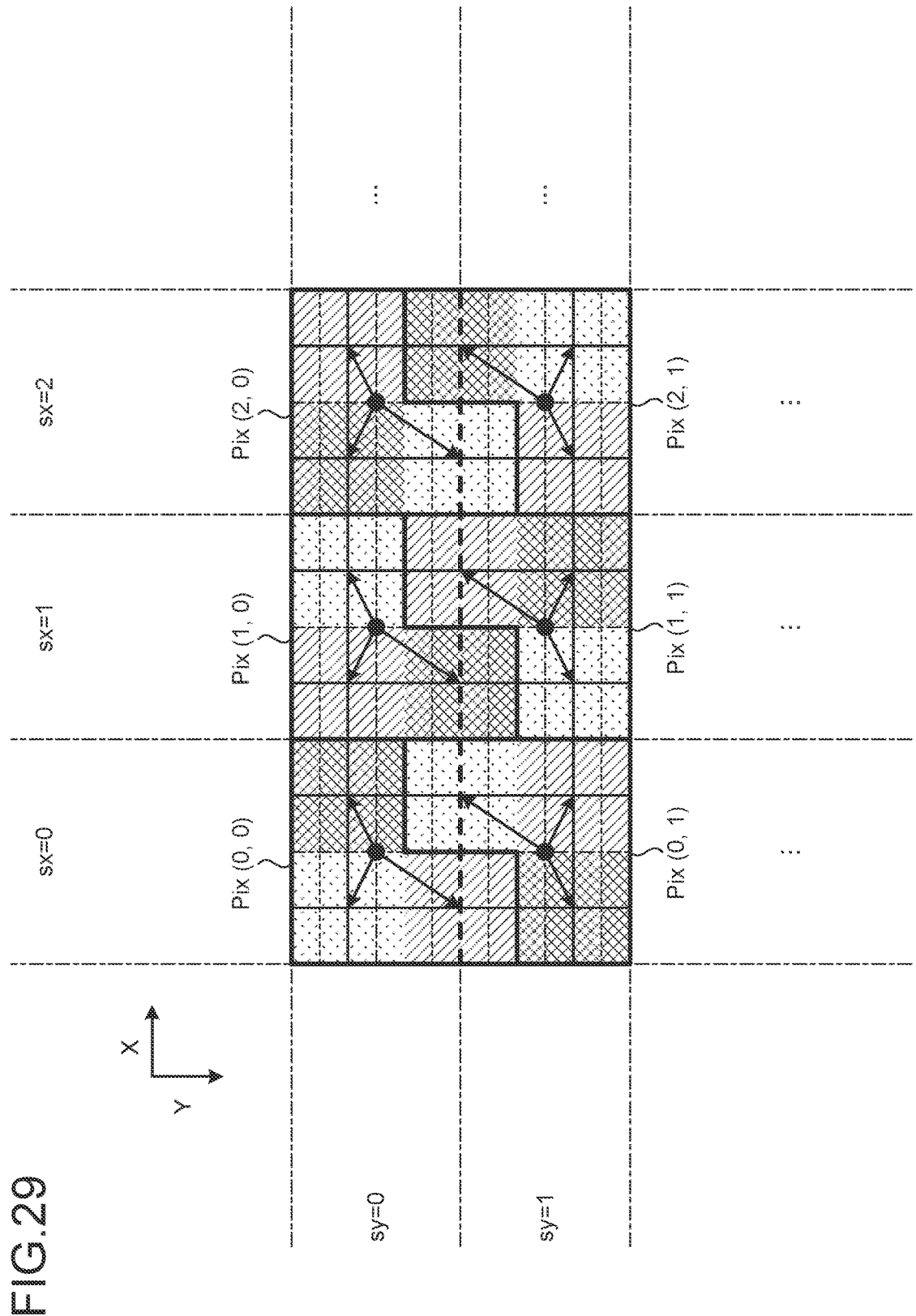
FIG. 29 is a conceptual diagram for description of the definition of pixel data in the pixel configuration illustrated in FIG. 28.

FIG. 29 is a conceptual diagram for description of the definition of pixel data in the pixel configuration illustrated in FIG. 28. In FIG. 29, a virtual central position corresponding to each pixel Pix (sx, sy) is illustrated with a black point. Pixel data corresponding to each pixel Pix (sx, sy) includes the pixel values of the sub pixels SPixR, SPixG, and SPixB at the virtual central position of the pixel Pix (sx, sy). The difference between the virtual central position of each pixel Pix (sx, sy) and the central position of each sub pixel SPix corresponds to the difference of the position of the sub pixel from typical position of a pixel, which is described above with reference to FIGS. 12A and 12B.

As described above, in the pixel configuration illustrated in FIG. 28, the configuration of a total of six pixels of three pixels in the X direction and two pixels in the Y direction repeatedly appears in the X and Y directions. Thus, in the pixel configuration illustrated in FIG. 28, the four coefficients $k_{xp}$, $k_{xm}$, $k_{yp}$, and $k_{ym}$ that define the shift of the position of a sub pixel from a typical position of a pixel, which is illustrated in FIGS. 12A and 12B, have values illustrated in FIG. 30 when the sizes of each pixel Pix (sx, sy) in the X and Y directions are normalized to 1.

FIG. 30 is a diagram illustrating the four coefficient values for each sub pixel in the pixel configuration illustrated in FIG. 28. In FIG. 30, the four coefficients $k_{xp}$, $k_{xm}$, $k_{yp}$, and $k_{ym}$ are indicated as $k_{xpQ}$, $k_{xmQ}$, $k_{ypQ}$, and $k_{ymQ}$ (Q=R, G, and B), respectively. These coefficients are constants that are determined in accordance with the pixel configuration of the display panel 110. Thus, the coordinate transform table illustrated in FIG. 15 or the coordinate transform table illustrated in FIG. 16 can be generated by holding the coefficient values illustrated in FIG. 30 as a table in the storage 220 of the image generation device 200.

The area averaging method or the multipoint averaging method described above can be used as a method of sampling each pixel value in the pixel configuration illustrated in FIG. 28. The following describes exemplary calculation of pixel values in the pixel configuration illustrated in FIG. 28 by using the multipoint averaging method.

Figure 31:
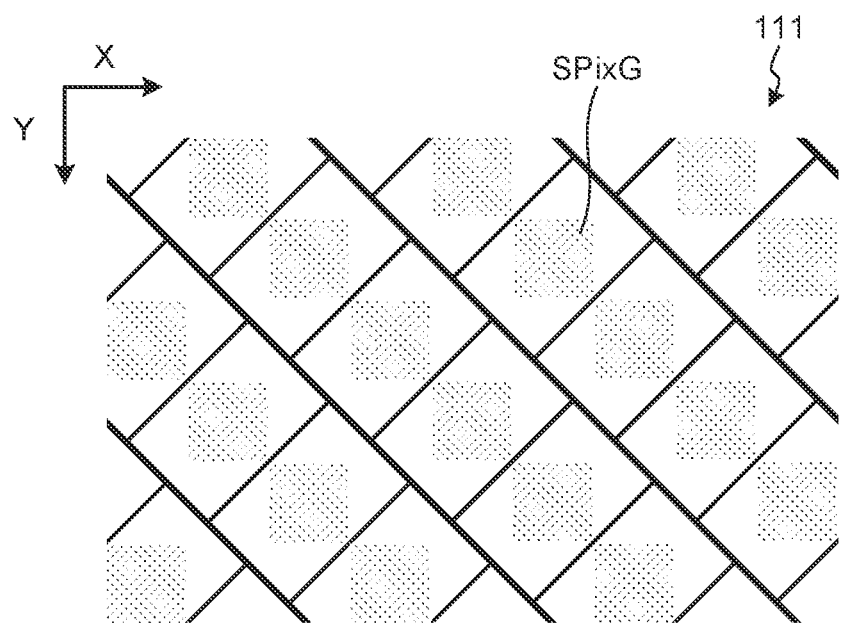
FIG. 31 is a diagram illustrating an example of plane-filling figures applied to a sampling method using the multipoint averaging method in the pixel configuration illustrated in FIG. 28.

FIG. 31 is a diagram illustrating an example of a plane-filling figure applied to a sampling method using the multipoint averaging method in the pixel configuration illustrated in FIG. 28. FIG. 31 illustrates an example of tiling the plane-filling figures obtained by obliquely partitioning the display region 111 of the display panel 110 with the sub pixel SPixG being at the center of each plane-filling figure.

Figure 32:
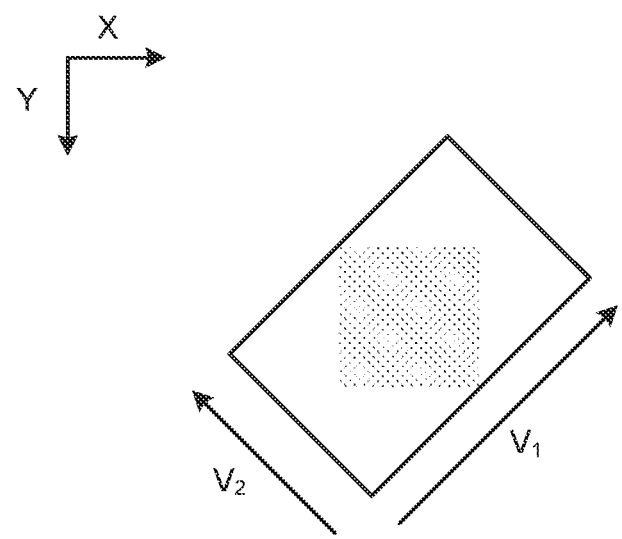
FIG. 32 is a diagram illustrating vectors representing the size and orientation of each plane-filling figure illustrated in FIG. 31 in the XY coordinate system.

FIG. 32 is a diagram illustrating vectors representing the size and orientation of each plane-filling figure illustrated in FIG. 31 in the XY coordinate system. In FIG. 32, vectors $V_1$ and $V_2$ indicate the region of the plane-filling figure on the display region 111 of the display panel 110. In other words, the plane-filling figure illustrated in FIG. 32 has a rhombus shape indicated by the vectors $V_1$ and $V_2$ in two directions different from the X and Y directions. The vector $V_1$ is the vector of spacing between adjacent sub pixels SPix of the same color, and the vector $V_2$ is a vector orthogonal to the vector $V_1$ and having a size equal to the distance (=1.2 pixels) between sub pixels SPix of the same color, which are arranged in the oblique direction. The vectors $V_1$ and $V_2$ are expressed by Expressions (57) and (58) below.

$$V_1=0.96x-(\tfrac{2}{3})y \qquad (57)$$

$$V_2=-0.5x-0.72y \qquad (58)$$

Figure 33:
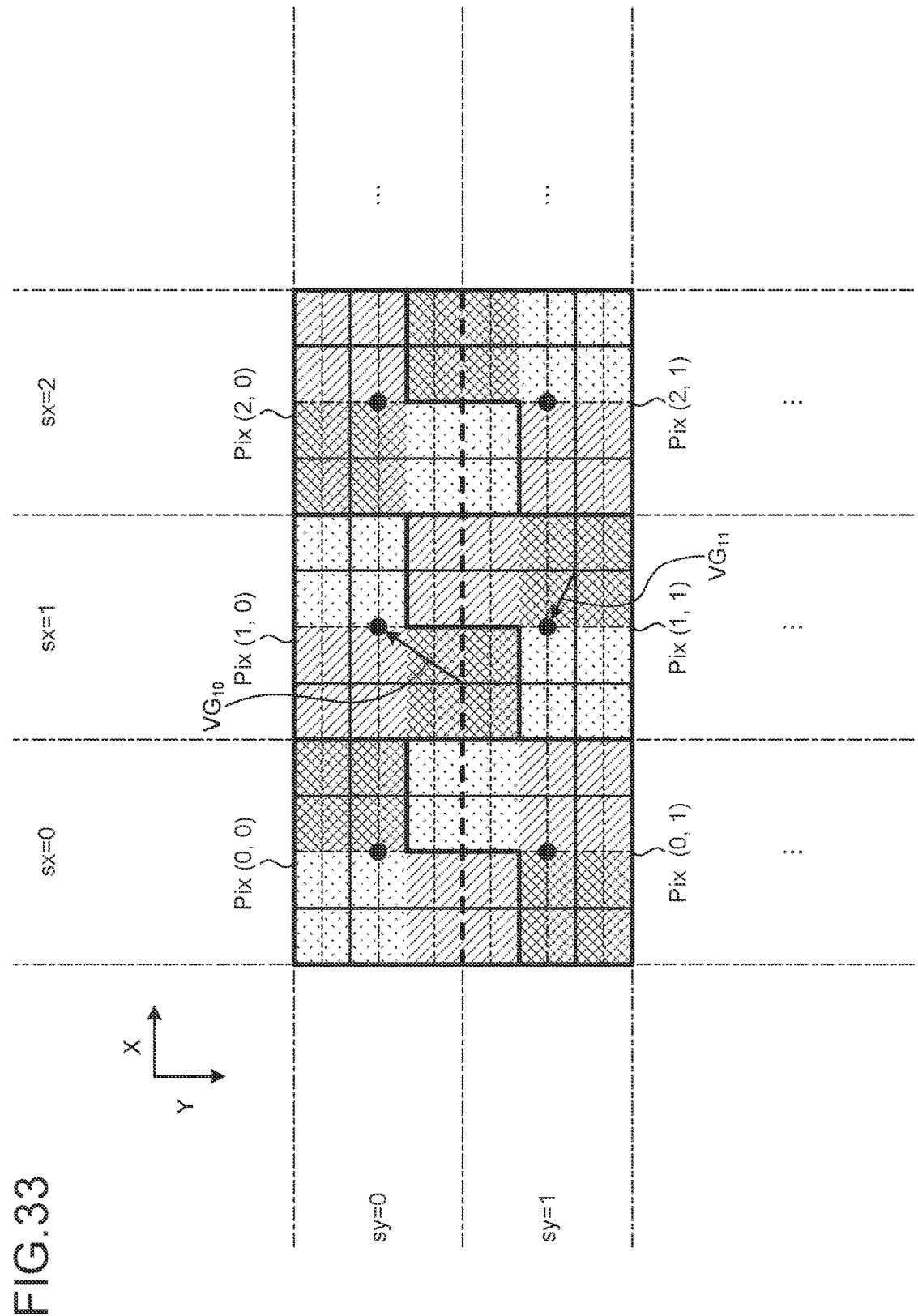
FIG. 33 is a diagram illustrating an example of vectors of a plane-filling figure applied to the sampling method using the multipoint averaging method in the pixel arrangement illustrated in FIG. 28.

When a polygon mesh corresponding to the sub pixel SPixG is used as a reference polygon mesh to derive the coordinate transform table tb2Q (Q=R, B, G), the coordinate transform table tb2G of the sub pixel SPixG contains no influence of chromatic aberration correction, but only the difference between the virtual central position of the pixel Pix and the central position of the sub pixel SPixG is reflected. Thus, the vectors $E_1$ and $E_2$ in the uv coordinate system corresponding to the vectors $V_1$ and $V_2$ can be derived from values included in the coordinate transform table tb2G of the sub pixel SPixG. FIG. 33 is a diagram illustrating an example of vectors of a plane-filling figure applied to the sampling method using the multipoint averaging method in the pixel arrangement illustrated in FIG. 28.

As illustrated in FIG. 33, in the pixel arrangement illustrated in FIG. 28, when $VG_{10}$ denotes a vector indicating the virtual central position of the pixel Pix (1, 0) with respect to the central position of the sub pixel SPixG (2, 1) of the pixel Pix (1, 0) and $VG_{11}$ denotes a vector indicating the virtual central position of the pixel Pix (1, 1) of the central position with respect to the sub pixel SPixG (3, 2) of the pixel Pix (1, 1), the vectors $VG_{10}$ and $VG_{11}$ can be expressed by Expressions (59) and (60) below.

$$VG_{10} = -0.25x + 0.5y \quad (59)$$

$$VG_{11} = 0.25x + (\tfrac{1}{6})y \quad (60)$$

The vectors $V_1$ and $V_2$ of the plane-filling figure illustrated in FIG. 32 in the XY coordinate system are expressed by Expressions (61) and (62) below by using the vectors $VG_{10}$ and $VG_{11}$.

$$V_1 = -1.96 VG_{10} + 1.88 VG_{11} \quad (61)$$

$$V_2 = -0.58 VG_{10} - 2.58 VG_{11} \quad (62)$$

Expressions (59), (60), (61), and (62) above approximately hold in the uv coordinate system, and thus in processing of obtaining actual pixel values, a vector $EG_{10}$ and a vector $EG_{11}$ in the texture coordinate system can be produced for the vectors $VG_{10}$ and $VG_{11}$, and the vector $E_1$ for the vector $V_1$ and the vector $E_2$ for the vector $V_2$ can be calculated. Thus, approximate vectors $EG_{10}$ and $EG_{11}$ are obtained by referring, in the coordinate transform table tb2G of the sub pixel SPixG, a difference value corresponding to the sub pixel SPixG of a pixel for the pixel Pix (1, 0) and a difference value corresponding to the sub pixel SPixG of a pixel for the pixel Pix (1, 1), the pixels being positioned close to a pixel to be sampled. The vectors $E_1$ and $E_2$ can be calculated by Expressions (61) and (62) above by using the vectors $EG_{10}$ and $EG_{11}$. The sampling point derivation by Expressions (44) to (48) above can be performed by using the vectors $E_1$ and $E_2$ thus calculated.

Figure 34:
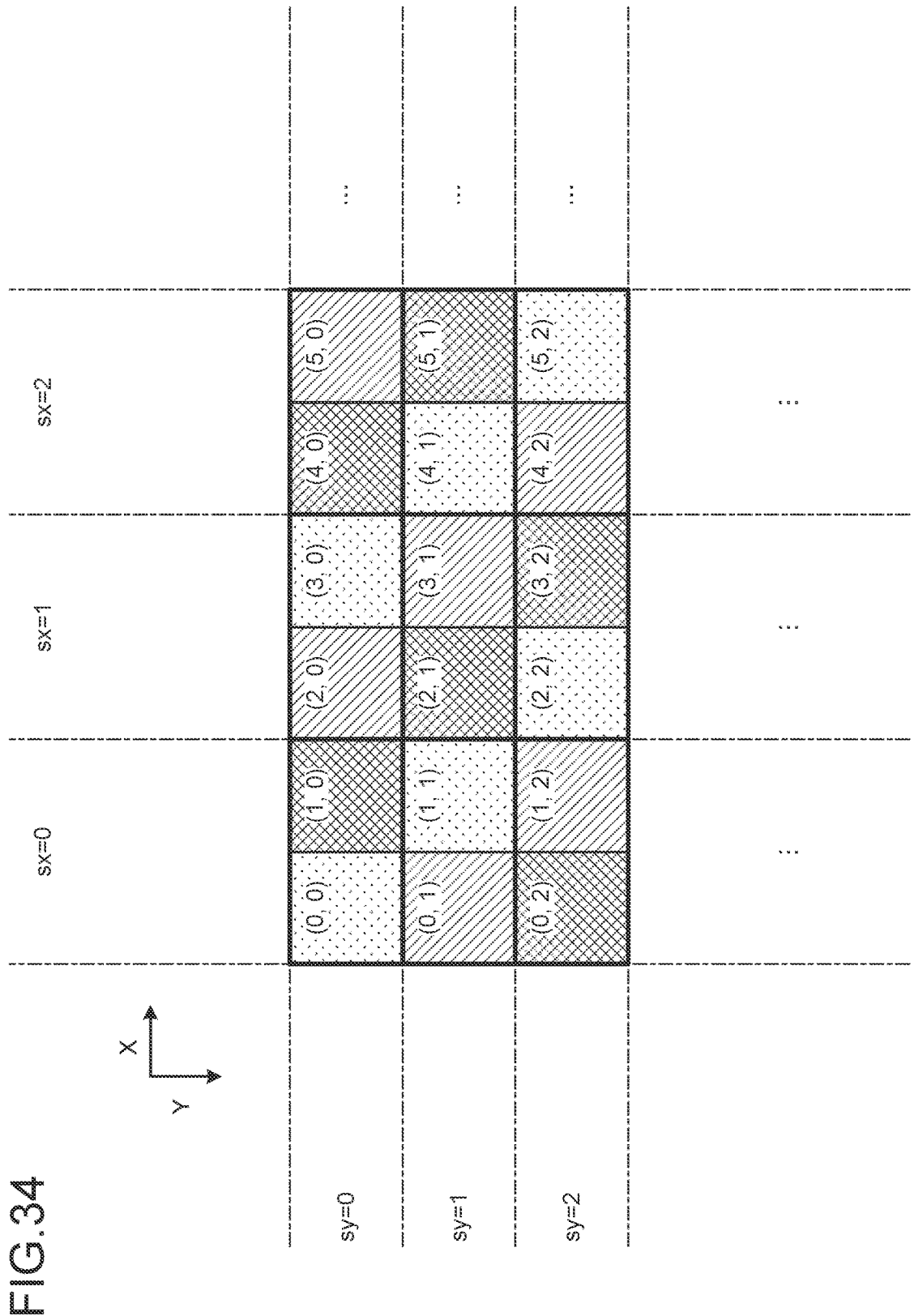
FIG. 34 is a diagram illustrating a second example of the pixel configuration of the display panel according to the embodiment.

FIG. 34 is a diagram illustrating a second example of the pixel configuration of the display panel according to the embodiment. In the example illustrated in FIG. 34, two of the sub pixels SPixR, SPixG, and SPixB are used as one pixel unit. Accordingly, the number of colors of sub pixels included in one pixel Pix is smaller than the number of colors (three colors of red (R), green (G), and blue (B)) defined for the input image.

In the pixel configuration illustrated in FIG. 34, what is called subpixel rendering processing is performed on the original image data input to the display system 1 illustrated in FIG. 9 to reduce degradation of the display quality of a display image on the display panel 110. In the present disclosure, when the image deformation processing is performed by the control circuit 230 of the image generation device 200, pixel data on which subpixel rendering processing in accordance with the pixel configuration of the display panel 110 is reflected is generated and transmitted to the display device 100, which eliminates the need for subpixel rendering processing on the display device 100 side, whereby the amount of processing at the display control circuit 112 of the display panel 110 can be reduced. The present disclosure is not limited by this method of subpixel rendering processing.

In the pixel configuration illustrated in FIG. 34, the configuration of a total of nine pixels of three pixels in the X direction and three pixels in the Y direction repeatedly appears in the X and Y directions. The nine pixels of 3×3 pixels are treated as one pixel block.

The coordinates sx and sy of each pixel (sx, sy) can be expressed by Expressions (63) and (64) below, respectively. In Expressions (63) and (64) below, % represents calculation that obtains the remainder of division.

$$sx = x \% 3 \quad (63)$$

$$sy = y \% 3 \quad (64)$$

In the example illustrated in FIG. 34, a pixel Pix (0, 0) includes a sub pixel SPixR (0, 0) and a sub pixel SPixG (1, 0). A pixel Pix (1, 0) includes a sub pixel SPixB (2, 0) and a sub pixel SPixG (3, 0). A pixel Pix (2, 0) includes a sub pixel SPixG (4, 0) and a sub pixel SPixB (5, 0).

A pixel Pix (0, 1) includes a sub pixel SPixB (0, 1) and a sub pixel SPixR (1, 1). A pixel Pix (1, 1) includes a sub pixel SPixG (2, 1) and a sub pixel SPixB (3, 1). A pixel Pix (2, 1) includes a sub pixel SPixR (4, 1) and a sub pixel SPixG (5, 1).

A pixel Pix (0, 2) includes a sub pixel SPixG (0, 2) and a sub pixel SPixB (1, 2). A pixel Pix (1, 2) includes a sub pixel SPixR (2, 2) and a sub pixel SPixG (3, 2). A pixel Pix (2, 2) includes a sub pixel SPixB (4, 2) and a sub pixel SPixR (5, 2).

In this example, the control circuit 230 of the image generation device 200 transmits pixel data including the pixel values of the sub pixels SPixR, SPixG, and SPixB for each pixel Pix (sx, sy) in the pixel configuration illustrated in FIG. 28 to the display panel 110 according to the embodiment in the pixel configuration illustrated in FIG. 34. In this case, the four coefficients $k_{xp}$, $k_{xm}$, $k_{yp}$, and $k_{ym}$ that define the shift of the position of a sub pixel from a typical position of a pixel, which is illustrated in FIGS. 12A and 12B, have values illustrated in FIG. 35 when the sizes of each pixel Pix (sx, sy) in the X and Y directions are normalized to 1.

FIG. 35 is a diagram illustrating the four coefficient values for each sub pixel in the pixel configuration illustrated in FIG. 34. In FIG. 35, "-" indicates that no corresponding data exists. For example, in the pixel configuration illustrated in FIG. 34, the pixels Pix (0, 0), (2, 1), and (1, 2) include no sub pixel SPixB. The pixels Pix (1, 0), (0, 1), and (2, 2) include no sub pixel SPixG. The pixels Pix (2, 0), (1, 1), and (0, 2) include no sub pixel SPixR.

When pixel data including the pixel values of the sub pixels SPixR, SPixG, and SPixB for each pixel Pix (sx, sy) in the pixel configuration illustrated in FIG. 34 is transmitted, pixel data of any sub pixel SPix not included in the pixel Pix (sx, sy) needs to be transmitted as a "Null" value, and waste occurs to the amount of actually displayed data.

In order to eliminate transmission waste, for example, data is allocated to disposition of a pixel including the pixel values of the sub pixels SPixR, SPixG, and SPixB for each pixel Pix (sx, sy) in the pixel configuration illustrated in FIG. 28, and data organized in, for example, the typical image data format illustrated in FIG. 9 is transmitted, which enables efficient data transmission without occurrence of waste to the amount of actually displayed data. With the pixel configuration illustrated in FIG. 28, the number of pixels in an image in the Y direction is ⅔ of that with the pixel configuration illustrated in FIG. 34 since each pixel Pix includes three sub pixels SPix, and the ratio of the number of pixels in the X direction and the number of pixels in the Y direction in the image data format changes. However, most image data compression algorithms for data transmission compress three RGB pieces of data by disassembling the data into luminance and color difference, and thus application to a large number of image data compression algorithms is possible by applying, for example, the typical image data format illustrated in FIG. 9 and treating data of the sub pixels SPixR, SPixG, and SPix as one pixel data.

A pixel configuration when display is performed by using two of the sub pixels SPixR, SPixG, and SPixB as one pixel unit is not limited to the pixel configuration illustrated in FIG. 34. In the present disclosure, mosaic arrangement is exemplarily described above as the pixel arrangement of the display panel 110, but the present invention is not limited thereto and the pixel arrangement may be, for example, delta arrangement or PenTile arrangement.

Figure 36A:
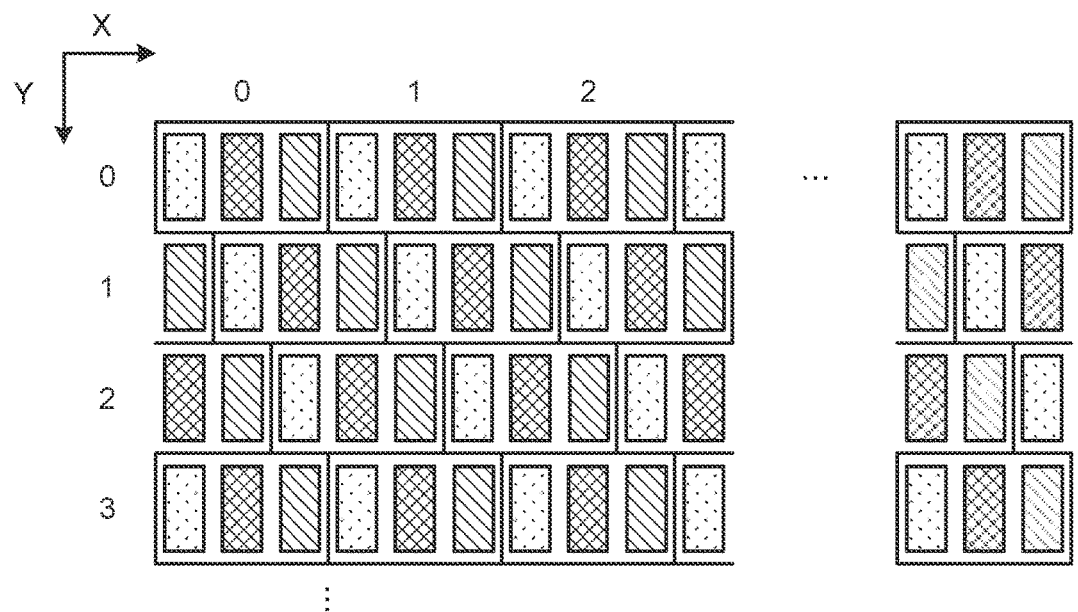
FIG. 36A is a conceptual diagram illustrating a different example of the format of pixel data transmission from that in FIG. 28.
Figure 36B:
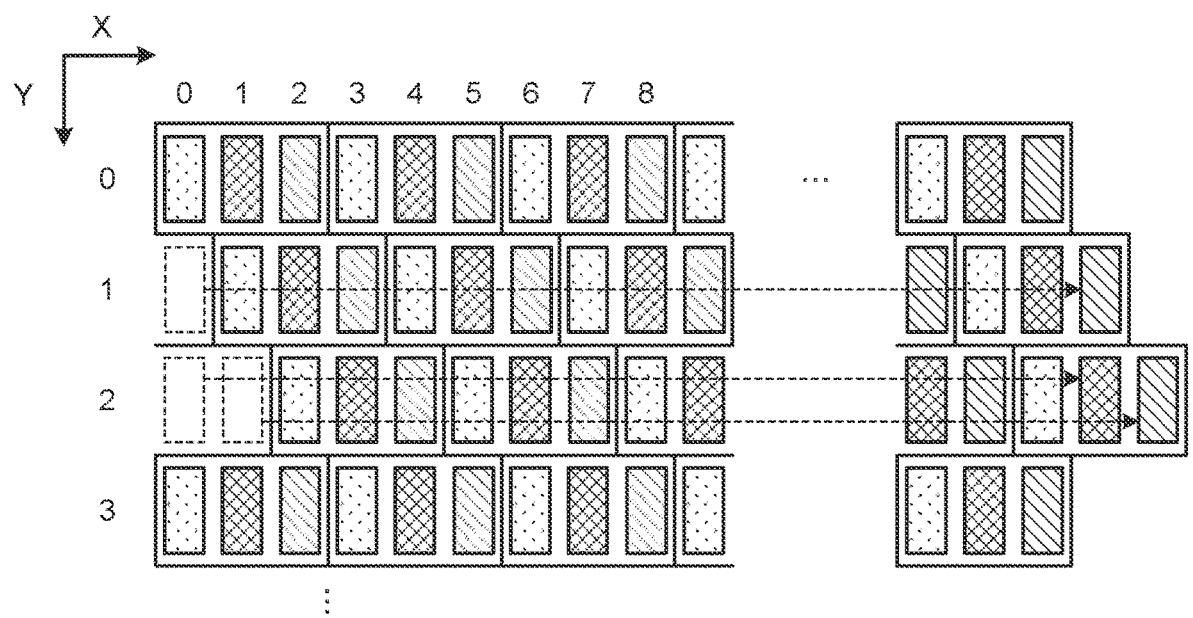
FIG. 36B is a conceptual diagram illustrating the different example of the format of pixel data transmission from that in FIG. 28.

The format of transmission of pixel data including the pixel values of the sub pixels SPixR, SPixG, and SPixB from the control circuit 230 of the image generation device 200 to each display panel 110 is not limited to transmission of pixel data including the pixel values of the sub pixels SPixR, SPixG, and SPixB for each pixel Pix (sx, sy) in the pixel configuration illustrated in FIG. 28. FIGS. 36A and 36B are conceptual diagrams illustrating a different example of the format of pixel data transmission from that in FIG. 28.

In the example illustrated in FIGS. 36A and 36B, pixel data is basically sent with the sub pixels SPixR, SPixG, and SPixB arranged in the X direction as one pixel Pix, pixel data is sent as one pixel Pix with pixel data of the sub pixel SPixB (0, 1) in the line of y=1 added after the sub pixel SPixG in the last column, and pixel data is sent as one pixel Pix with pixel data of the sub pixel SPixG (0, 2) and the sub pixel SPixB (1, 2) in the line of y=2 added after the sub pixel SPixR in the last column. Accordingly, the number of pieces of pixel data in the X direction is equal among the lines. Moreover, missing pixel data positioned at each end in the X direction does not need to be transmitted as a "Null" value, which enables efficient data transmission.

As described above, the coordinate transform table tb1Q illustrated in FIG. 15 (Q=R, G, and B) and the coordinate transform table tb2Q illustrated in FIG. 16 (Q=R, G, and B) require three tables corresponding to the respective sub pixels SPixR, SPixG, and SPixB. Strictly speaking, in the present disclosure, individual data corresponding to all sub pixels SPix constituting an image displayed on each display panel 110 is required to geometrically deform an image input to the display system 1. This increases a load on the storage capacity of the storage 220 of the image generation device 200.

Figure 37A:
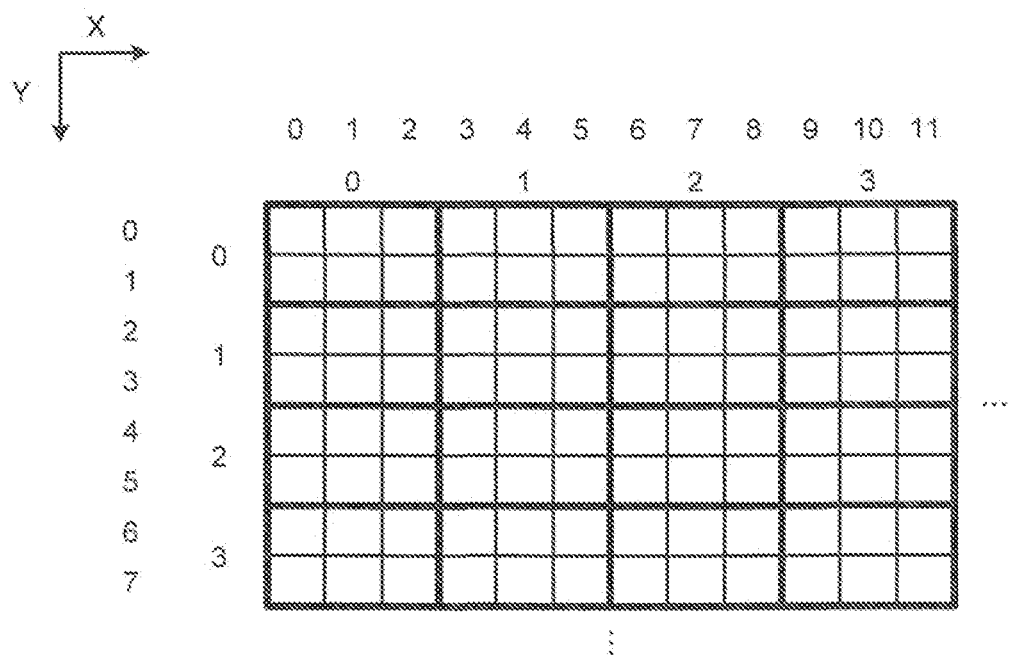
FIG. 37A is a conceptual diagram illustrating a modification of the coordinate transform table.
Figure 37B:
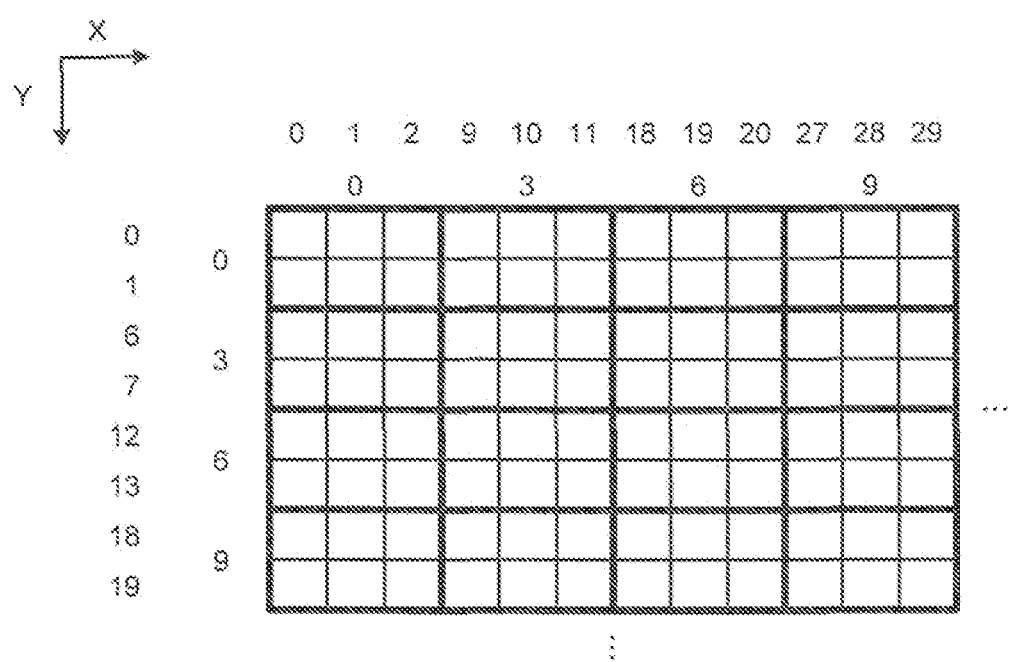
FIG. 37B is a conceptual diagram illustrating a modification of the coordinate transform table.

FIGS. 37A and 37B are conceptual diagrams illustrating modifications of a coordinate transform table. In the conceptual diagram illustrated in FIG. 37A, data value is provided for each sub pixel SPix. In the conceptual diagram illustrated in FIG. 37B, the same data is applied to a plurality of pixel blocks in a region in which data value change for each pixel block is small as described above. In the example illustrated in FIG. 37B, for example, the data values of pixel blocks (0, 0), (1, 0), (2, 0), (0, 1), (1, 1), (2, 1), (0, 2), (1, 2), and (2, 2) of six pixels of 3×2 pixels illustrated in FIG. 37A are set to be the same. In this manner, the data amount of the coordinate transform table tb2Q (Q=R, G, and B) as a whole can be reduced to 1/9 by setting the same data value to the nine pixel blocks of 3×3 pixel blocks in the X and Y directions.

In the example illustrated in FIG. 37B, the configuration of a total of six pixels of three pixels in the X direction and two pixels in the Y direction is one pixel block, but the configuration of one pixel block is not limited thereto. For example, one pixel block may be the configuration of a total of nine pixels of three pixels in the X direction and three pixels in the Y direction as illustrated in FIG. 34 or may be one pixel. Although FIGS. 37A and 37B illustrate the modification of the coordinate transform table tb2Q (Q=R, G, and B), the same is true for the coordinate transform table tb1Q (Q=R, G, and B).

Figures 38, 39:
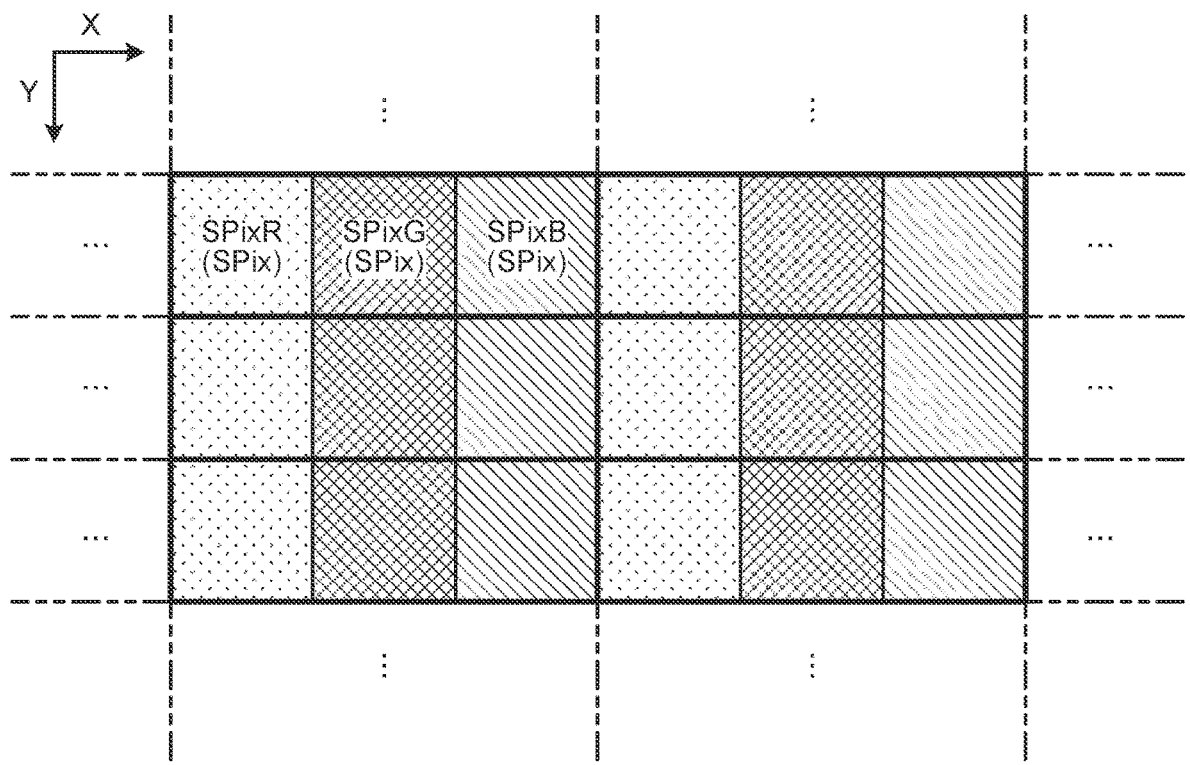
FIG. 38 is a diagram illustrating a second example of the pixel arrangement of the display panel according to the embodiment.
FIG. 39 is a diagram illustrating four coefficient values for each sub pixel in the pixel configuration of an RGB stripe arrangement illustrated in FIG. 38.

FIG. 38 is a diagram illustrating a second example of the pixel arrangement of each display panel according to the embodiment. In the second example of the pixel arrangement illustrated in FIG. 38, the pixel arrangement of the display panel 110 according to the embodiment is RGB stripe arrangement. In the RGB stripe arrangement, pixels Pix in which the sub pixels SPixR, SPixG, and SPixB are arranged in the same order in the X direction are arranged in a matrix of rows and columns in the X and Y directions. When the present disclosure is applied to the pixel configuration of the RGB stripe arrangement illustrated in FIG. 38, the four coefficients $k_{xp}$, $k_{xm}$, $k_{yp}$, and $k_{ym}$ that define the shift of the position of a sub pixel from a typical position of a pixel, which is illustrated in FIGS. 12A and 12B, have values illustrated in FIG. 39 when the sizes of each pixel Pix (sx, sy) in the X and Y directions are normalized to one.

FIG. 39 is a diagram illustrating the four coefficient values for each sub pixel in the pixel configuration of the RGB stripe arrangement illustrated in FIG. 38. As illustrated in FIG. 39, in the RGB stripe arrangement, every coefficient value corresponding to the sub pixel SPixG is zero, and the central position of the pixel Pix (x, y) overlaps the central position of the sub pixel SPixG. Thus, the coordinate transform table tb1G and the coordinate transform table tb2G for the sub pixel SPixG are unnecessary.

In a case in which the pixel arrangement of each display panel 110 is the RGB stripe arrangement as illustrated in FIG. 38, when the image deformation processing is performed by the control circuit 230 of the image generation device 200 in resolution conversion processing or the like on image data of the original image input to the display system 1, image data on which resolution conversion processing in accordance with the resolution of the display panel 110 is reflected is generated and transmitted to the display device 100, which eliminates the need for resolution conversion processing on the display device 100 side, whereby the amount of processing at the display control circuit 112 of the display panel 110 can be reduced. The present disclosure is not limited by this method of resolution conversion processing.

According to the present embodiment, the display system 1 can transmit and receive image data in a data amount in accordance with the pixel arrangement of each display panel.

Preferable embodiments of the present disclosure are described above, but the present disclosure is not limited to such embodiments. Contents disclosed in the embodiments are merely exemplary, and various kinds of modifications are possible without departing from the scope of the present disclosure. Any modification performed as appropriate without departing from the scope of the present disclosure belongs to the technical scope of the present disclosure.

What is claimed is:

1. A display system comprising:
   a display device including a liquid crystal display panel including pixels, the pixels each including a plurality of sub pixels and being arranged in a matrix of rows and columns in a first direction and a second direction different from the first direction; and an image generation device including a control circuit configured to perform image deformation processing of an input image in accordance with a pixel structure of the liquid crystal display panel, wherein the image generation device and the display device are coupled to each other through wired or wireless communication, the control circuit generates pixel values of all the sub pixels of the liquid crystal display panel in the image deformation processing the display device includes a lens that enlarges an image displayed on the liquid crystal display panel, in the image deformation processing, the control circuit compensates at least geometric image distortion due to aberration of the lens and deforms the input image into a shape to be visually recognized by a user, the input image includes color data corresponding to colors of the sub pixels for each of a plurality of data definition points virtually disposed in a matrix of rows and columns in the first direction and the second direction, and in the image deformation processing, the control circuit generates a pixel value of each of the sub pixels by sampling the color data at one or more of the data definition points.

2. The display system according to claim 1, wherein the control circuit generates the pixel value of each of the sub pixels in accordance with disposition of the data definition points after moved by the image deformation processing.

3. The display system according to claim 2, wherein in the image deformation processing, the control circuit performs sampling for each sub pixel by using an area averaging method.

4. The display system according to claim 2, wherein in the image deformation processing, the control circuit performs sampling for each sub pixel by using a multipoint averaging method.

5. The display system according to claim 4, wherein a plane-filling figure when the sampling for each sub pixel is performed by using the multipoint averaging method has a rhombus shape expressed by vectors in two directions different from the first direction and the second direction.

6. The display system according to claim 1, wherein
the image generation device includes a storage, and
in the image deformation processing, the control circuit calculates the pixel values based on a coordinate transform table stored in the storage.

7. The display system according to claim 6, wherein the control circuit generates the coordinate transform table by using a polygon mesh and stores the coordinate transform table in the storage.

8. The display system according to claim 7, wherein the control circuit generates a plurality of the coordinate transform tables in accordance with relative positions of the plurality of sub pixels.

9. The display system according to claim 8, wherein the control circuit generates the coordinate transform tables in accordance with an image magnification of the lens for each sub pixel.

10. The display system according to claim 6, wherein the coordinate transform tables include individual data corresponding to all the sub pixels of the liquid crystal display panel.

11. The display system according to claim 6, wherein the coordinate transform tables apply same data to a plurality of pixel blocks each constituted by one or a plurality of the pixels.

12. The display system according to claim 1, wherein the number of colors of sub pixels included in each pixel is smaller than the number of colors defined for the input image.

13. The display system according to claim 1, wherein resolution of the liquid crystal display panel is different from resolution of the input image.

* * * * *